(12) United States Patent
Rabinowitz et al.

(10) Patent No.: US 6,727,847 B2
(45) Date of Patent: Apr. 27, 2004

(54) USING DIGITAL TELEVISION BROADCAST SIGNALS TO PROVIDE GPS AIDING INFORMATION

(75) Inventors: Matthew Rabinowitz, Portola Valley, CA (US); James J. Spilker, Jr., Woodside, CA (US); Jimmy K. Omura, San Francisco, CA (US); Matthew D. Pierce, Los Angeles, CA (US)

(73) Assignee: Rosum Corporation, Redwood City, CA (US)

(*) Notice: Subject to any disclaimer, the term of this patent is extended or adjusted under 35 U.S.C. 154(b) by 0 days.

(21) Appl. No.: 10/292,316

(22) Filed: Nov. 12, 2002

(65) Prior Publication Data

US 2003/0201932 A1 Oct. 30, 2003

Related U.S. Application Data

(63) Continuation-in-part of application No. 10/003,128, filed on Nov. 14, 2001, application No. 10/292,316, and a continuation-in-part of application No. 10/159,478, filed on May 31, 2002, which is a continuation-in-part of application No. 09/887,158, filed on Jun. 21, 2001, now abandoned.

(60) Provisional application No. 60/361,762, filed on Mar. 4, 2002, provisional application No. 60/353,440, filed on Feb. 1, 2002, provisional application No. 60/332,504, filed on Nov. 13, 2001, and provisional application No. 60/281,269, filed on Apr. 3, 2001.

(51) Int. Cl.[7] .............................. H04B 7/185; G01S 5/04
(52) U.S. Cl. .............................. 342/357.06; 342/357.09
(58) Field of Search ..................... 342/357.03, 357.06, 342/357.09; 701/213, 215

(56) References Cited

U.S. PATENT DOCUMENTS

| 5,157,686 | A | 10/1992 | Omura et al. |
|---|---|---|---|
| 5,166,952 | A | 11/1992 | Omura et al. |
| 5,952,958 | A | 9/1999 | Speasl et al. |
| 6,131,067 | A | 10/2000 | Girerd et al. |
| 6,160,587 | A | 12/2000 | Walker et al. |
| 6,400,767 | B1 | 6/2002 | Nuber et al. |
| 6,487,500 | B2 | 11/2002 | Lemelson et al. |
| 2001/0046262 | A1 | 11/2001 | Freda |
| 2002/0008662 | A1 | 1/2002 | Dooley et al. |
| 2002/0090997 | A1 | 7/2002 | Bailey |
| 2002/0144294 | A1 | 10/2002 | Rabinowitz et al. |
| 2002/0172313 | A1 | 11/2002 | Smith et al. |

*Primary Examiner*—Dao Phan
(74) *Attorney, Agent, or Firm*—Richard A. Dunning, Jr.

(57) ABSTRACT

A method, apparatus, and computer-readable media for providing satellite positioning system aiding information to a satellite positioning system receiver configured to determine the position of the satellite positioning system receiver using the satellite positioning system aiding information and the propagation time of a signal transmitted by a satellite in the satellite positioning system comprises providing the satellite positioning system aiding information; providing a digital television signal comprising a plurality of frames, each frame comprising a plurality of data segments; encoding the satellite positioning system aiding information as codewords; replacing data segments within the digital television signal with the codewords; and transmitting the digital television signal; wherein the satellite positioning system receiver receives the digital television signal and recovers the satellite positioning system aiding information.

56 Claims, 18 Drawing Sheets

$[C_0, C_1]$

FIG. 4C $[C_0 \ldots C_{N-1}]$ $[C_0 \ldots C_{N-1}]$ $[C_0 \ldots C_{N-1}]$ $[C_0 \ldots C_{N-1}]$ $[C_0 \ldots C_{N-1}]$ $[C_0 \ldots C_{N-1}]$ xxx

FIG. 4D

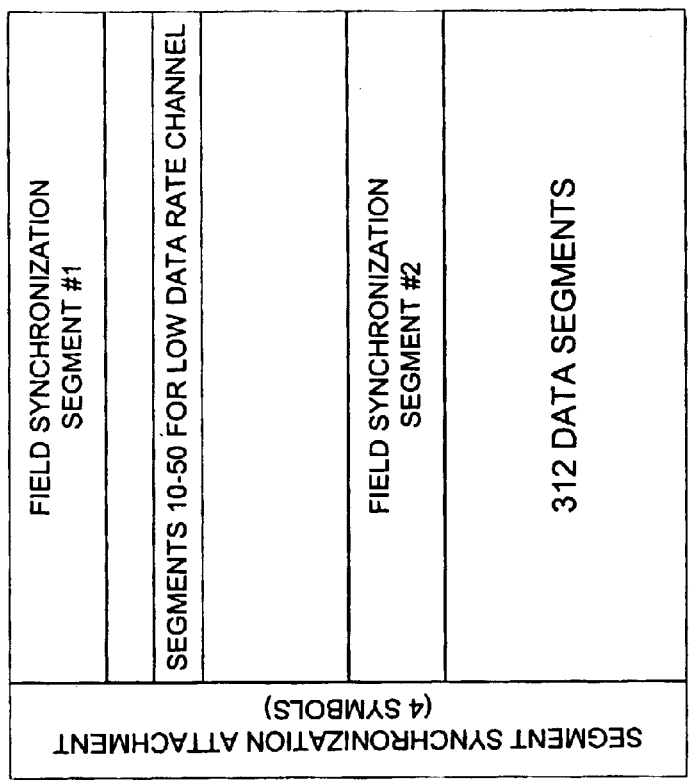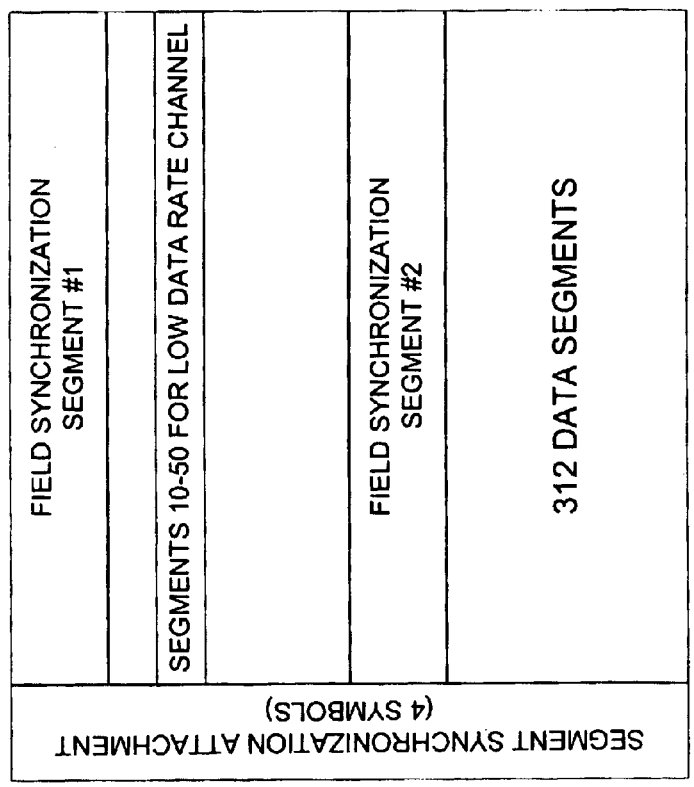
FIG. 5A

USING DIGITAL TELEVISION BROADCAST SIGNALS TO PROVIDE GPS AIDING INFORMATION

CROSS-REFERENCE TO RELATED APPLICATIONS

This application is a continuation-in-part of U.S. Non-provisional patent application Ser. No. 10/003,128, "Robust Data Transmission Using Broadcast Digital Television Signals," by Jimmy K. Omura, James J. Spilker, Jr. and Matthew Rabinowitz, filed Nov. 14, 2001, which claims the benefit of U.S. Provisional Patent Application Ser. No. 60/281,269, "An ATSC Standard DTV Channel for Low Data Rate Broadcast to Mobile Receivers," by James J. Spilker and Matthew Rabinowitz, filed Apr. 3, 2001, the disclosures thereof incorporated herein by reference in their entirety.

This application is a continuation-in-part of U.S. Non-provisional patent application Ser. No. 10/159,478, "Position Location using Global Positioning Signals Augmented by Broadcast Television Signals," by Matthew Rabinowitz and James J. Spilker, Jr., filed May 31, 2002, which is a continuation-in-part of U.S. Non-provisional patent application Ser. No. 09/887,158, "Position Location using Broadcast Digital Television Signals," by James J. Spilker and Matthew Rabinowitz, filed Jun. 21, 2001 now abandoned and claims the benefit of U.S. Provisional Patent Application Ser. No. 60/361,762, "DTV Position Location Augmented by GPS," by James J. Spilker, filed Mar. 4, 2002; U.S. Provisional Patent Application Ser. No. 60/353,440, "DTV Position Location Augmented by GPS," by James J. Spilker, filed Feb. 1, 2002; and U.S. Provisional Patent Application Ser. No. 60/332,504, "DTV Augmented GPS for Robust Aircraft Navigation," filed Nov. 13, 2001, the disclosures thereof incorporated herein by reference in their entirety.

This application claims the benefit of U.S. Provisional Patent Application Ser. No. 60/281,269, "An ATSC Standard DTV Channel for Low Data Rate Broadcast to Mobile Receivers," by James J. Spilker and Matthew Rabinowitz, filed Apr. 3, 2001, the disclosure thereof incorporated herein by reference in its entirety.

This application is related to U.S. Non-provisional patent application Ser. No. 09/932,010, "Position Location using Terrestrial Digital Video Broadcast Television Signals," by James J. Spilker and Matthew Rabinowitz, filed Aug. 17, 2001 and U.S. Provisional Patent Application Ser. No. 60/337,834, "Wireless Position Location Using the Japanese ISDB-T Digital TV Signals," by James J. Spilker, filed Nov. 9, 2001, the disclosures thereof incorporated herein by reference in their entirety.

BACKGROUND

This invention relates generally to the transmission of data via broadcast digital television signals, for example digital television signals which follow the American Television Standards Committee (ATSC) format, and more particularly to the transmission of global positioning system (GPS) aiding information by such techniques.

Starting with the first ATSC standard digital television broadcast in the late 1990's, digital television broadcasting is rapidly expanding in the United States. By the end of 2000, more than 166 digital television transmitters were in operation. The FCC has set a goal that by 2006 all television broadcasting will be on recently assigned digital channels with the analog channels being returned to the government for other applications.

Sophisticated data compression techniques and the availability of increased digital signal processing capabilities make it possible to transmit high quality audio and video information in the same bandwidth as analog channels. In the television broadcast community, the Advanced Television Systems Committee (ATSC) created both the digital television standard and the high-definition television standard to take advantage of these technological advances. These standards are often referred to as ATSC digital TV or simply ATSC. A current ATSC standard uses the amplitude modulated suppressed-carrier vestigial sideband modulation technique called VSB. The 8-VSB modulation is used in terrestrial "off air" broadcast systems and the 16-VSB modulation is proposed for higher data rate cable systems.

These standards are optimized for the broadcast of TV programming. However, the rapid expansion of digital TV broadcasting and the corresponding proliferation of digital television transmitters creates opportunities for the transmission of other types of data. Examples of other types of data include data to allow cell phones to compute their own location without the need for external processing, short messages, applications similar to those on pagers, stock quotes, web pages in text form, simple grid maps showing places of interest near a cell phone, TV programming guide, radio programming guide, bus schedules, advertisements for stores in the vicinity of the receiver, and all types of low data rate mobile-commerce information.

The television infrastructure is not always suited for these types of data. For example, the ATSC standard is geared towards a certain spectral efficiency, meaning that a certain amount of information is to be transmitted over a certain spectral bandwidth. Specifically, a bit rate which is high enough to support the broadcast of television programming must fit into the bandwidth allocated for a single television channel. With this operating requirement, a certain signal to noise ratio is required in order to successfully receive the broadcast signal. For example, the 19.2 Mbps ATSC standard broadcast data rate requires the receiver to have a theoretical signal-to-noise ratio of 15 dB.

However, other operating points may be more suitable for other types of data. For example, low data rate applications may benefit from a lower spectral efficiency but a more robust transmission. This type of signal may be recovered at much lower signal to noise ratios than required to receive digital television broadcasts, thus allowing reception in remote areas, indoors, or in locations where interference or multipath causes problems. In addition, simpler receivers may be used compared to those required to receive digital television broadcasts.

Thus, there is a need for systems and methods which can take advantage of the rapidly expanding digital TV (DTV) infrastructure, but for the transmission of data other than television programming. In particular, lower data rate transmissions which are more robust are of interest.

SUMMARY

In general, in one aspect, the invention features a method, apparatus, and computer-readable media for providing satellite positioning system aiding information to a satellite positioning system receiver configured to determine the position of the satellite positioning system receiver using the satellite positioning system aiding information and the propagation time of a signal transmitted by a satellite in the satellite positioning system. It comprises providing the satellite positioning system aiding information; providing a digital television signal comprising a plurality of frames, each frame comprising a plurality of data segments; encoding the satellite positioning system aiding information as codewords; replacing data segments within the digital television signal with the codewords; and transmitting the digital television signal; wherein the satellite positioning system receiver receives the digital television signal and recovers the satellite positioning system aiding information.

Particular implementations can include one or more of the following features. The satellite positioning system is the global positioning system (GPS). The satellite positioning system receiver determines the position of the satellite positioning system receiver based on the signal received from the satellite positioning system satellite and the satellite positioning system aiding information. The satellite positioning system aiding information comprises at least one of the group comprising a position of the satellite positioning system satellite; clock correction information for the satellite positioning system satellite; Doppler information for the signals transmitted by the satellite positioning system satellite; information regarding atmospheric effects on the signal transmitted by the satellite positioning system satellite; and identification of the satellite positioning system satellites that are visible to the satellite positioning system receiver. The digital television signal comprises at least one of the group comprising an American Television Standards Committee (ATSC) digital television signal; a European Telecommunications Standards Institute (ETSI) Digital Video Broadcasting-Terrestrial (DVB-T) signal; and a Japanese Integrated Services Digital Broadcasting-Terrestrial (ISDB-T) signal.

In general, in one aspect, the invention features a method, apparatus, and computer-readable media for recovering satellite positioning system aiding information from a digital television signal. It comprises receiving the digital television signal, the digital television signal comprising a plurality of frames, each frame comprising a plurality of data segments, wherein at least one data segment has been replaced by at least one codeword representing the satellite positioning system aiding information; selecting the data segments which have been replaced by codewords; and recovering the satellite positioning system aiding information from the selected data segments.

Particular implementations can include one or more of the following features. The satellite positioning system is the global positioning system (GPS). The satellite positioning system receiver determines the position of the satellite positioning system receiver based on the signal received from the satellite positioning system satellite and the satellite positioning system aiding information. The satellite positioning system aiding information comprises at least one of the group comprising a position of the satellite positioning system satellite; clock correction information for the satellite positioning system satellite; Doppler information for the signals transmitted by the satellite positioning system satellite; information regarding atmospheric effects on the signal transmitted by the satellite positioning system satellite; and identification of the satellite positioning system satellites that are visible to the satellite positioning system receiver. The digital television signal comprises at least one of the group comprising an American Television Standards Committee (ATSC) digital television signal; a European Telecommunications Standards Institute (ETSI) Digital Video Broadcasting-Terrestrial (DVB-T) signal; and a Japanese Integrated Services Digital Broadcasting-Terrestrial (ISDB-T) signal.

In general, in one aspect, the invention features a method, apparatus, and computer-readable media for determining a position of a satellite positioning system receiver using a satellite positioning system. It comprises receiving at the satellite positioning system receiver a signal transmitted by a satellite in the satellite positioning system; receiving at the satellite positioning system receiver a digital television signal comprising a plurality of frames, each frame comprising a plurality of data segments, wherein at least one data segment has been replaced by at least one codeword representing satellite positioning system aiding information; selecting the data segments which have been replaced by codewords; recovering the satellite positioning system aiding information from the selected data segments; and determining a position of the satellite positioning system receiver based on the signal received from the satellite positioning system satellite and the satellite positioning system aiding information.

Particular implementations can include one or more of the following features. The satellite positioning system is the global positioning system (GPS). The satellite positioning system aiding information comprises at least one of the group comprising a position of the satellite positioning system satellite; clock correction information for the satellite positioning system satellite; Doppler information for the signals transmitted by the satellite positioning system satellite; information regarding atmospheric effects on the signal transmitted by the satellite positioning system satellite; and identification of the satellite positioning system satellites that are visible to the satellite positioning system receiver. The digital television signal comprises at least one of the group comprising an American Television Standards Committee (ATSC) digital television signal; a European Telecommunications Standards Institute (ETSI) Digital Video Broadcasting-Terrestrial (DVB-T) signal; and a Japanese Integrated Services Digital Broadcasting-Terrestrial (ISDB-T) signal. Implementations comprise determining a pseudo-range between the satellite positioning system receiver and a transmitter of the digital television signal based on a known component of the digital television signal; and determining a position of the satellite positioning system receiver based on the pseudo-range, the signal received from the satellite positioning system satellite and the satellite positioning system aiding information. In accordance with the present invention, digital data is transmitted as part of a digital television (DTV) broadcast signal by encoding the digital data as codewords and replacing some of the data segments in the DTV signal with the codewords. The use of long codewords results in a transmission which is more robust than the portions of the DTV broadcast signal used for television programming and can therefore be received at lower signal to noise ratios. The use of a finite set of codewords allows recovery of the digital data using a simple bank of correlators at the receiver.

In general, in one aspect, the invention features an apparatus for providing satellite positioning system aiding information to a satellite positioning system receiver configured to determine the position of the satellite positioning system receiver using the satellite positioning system aiding information and the propagation time of a signal transmitted by a satellite in the satellite positioning system. It comprises a second satellite positioning system receiver to receive the satellite positioning system aiding information; a channel coder to provide a digital television signal comprising a plurality of frames, each frame comprising a plurality of data segments; an encoder to encode the satellite positioning system aiding information as codewords; a packet multiplexer to replace data segments within the digital television signal with the codewords; and a transmitter to transmit the digital television signal; wherein the satellite positioning system receiver receives the digital television signal and recovers the satellite positioning system aiding information.

Particular implementations can include one or more of the following features. The satellite positioning system is the global positioning system (GPS). The satellite positioning system receiver determines the position of the satellite positioning system receiver based on the signal received from the satellite positioning system satellite and the satellite positioning system aiding information. The satellite positioning system aiding information comprises at least one of the group comprising a position of the satellite positioning system satellite; clock correction information for the satellite positioning system satellite; Doppler information for the signals transmitted by the satellite positioning system satellite; information regarding atmospheric effects on the signal transmitted by the satellite positioning system satellite; and identification of the satellite positioning system satellites that are visible to the satellite positioning system receiver. The digital television signal comprises at least one of the group comprising an American Television Standards Committee (ATSC) digital television signal; a European Telecommunications Standards Institute (ETSI) Digital Video Broadcasting-Terrestrial (DVB-T) signal; and a Japanese Integrated Services Digital Broadcasting-Terrestrial (ISDB-T) signal.

In general, in one aspect, the invention features an apparatus for recovering satellite positioning system aiding information from a digital television signal. It comprises a front end to receive the digital television signal, the digital television signal comprising a plurality of frames, each frame comprising a plurality of data segments, wherein at least one data segment has been replaced by at least one codeword representing the satellite positioning system aiding information; and a back end to select the data segments which have been replaced by codewords and to recover the satellite positioning system aiding information from the selected data segments.

Particular implementations can include one or more of the following features. The satellite positioning system is the global positioning system (GPS). The satellite positioning system receiver determines the position of the satellite positioning system receiver based on the signal received from the satellite positioning system satellite and the satellite positioning system aiding information. The satellite positioning system aiding information comprises at least one of the group comprising a position of the satellite positioning system satellite; clock correction information for the satellite positioning system satellite; Doppler information for the signals transmitted by the satellite positioning system satellite; information regarding atmospheric effects on the signal transmitted by the satellite positioning system satellite; and identification of the satellite positioning system satellites that are visible to the satellite positioning system receiver. The digital television signal comprises at least one of the group comprising an American Television Standards Committee (ATSC) digital television signal; a European Telecommunications Standards Institute (ETSI) Digital Video Broadcasting-Terrestrial (DVB-T) signal; and a Japanese Integrated Services Digital Broadcasting-Terrestrial (ISDB-T) signal.

In general, in one aspect, the invention features an apparatus for determining a position of a satellite positioning system receiver using a satellite positioning system. It comprises a front end to receive a signal transmitted by a satellite in the satellite positioning system, and to receive a digital television signal comprising a plurality of frames, each frame comprising a plurality of data segments, wherein at least one data segment has been replaced by at least one codeword representing satellite positioning system aiding information; a back end to select the data segments which have been replaced by codewords and to recover the satellite positioning system aiding information from the selected data segments; and a processor to determine a position of the satellite positioning system receiver based on the signal received from the satellite positioning system satellite and the satellite positioning system aiding information.

Particular implementations can include one or more of the following features. The satellite positioning system is the global positioning system (GPS). The satellite positioning system receiver determines the position of the satellite positioning system receiver based on the signal received from the satellite positioning system satellite and the satellite positioning system aiding information. The satellite positioning system aiding information comprises at least one of the group comprising a position of the satellite positioning system satellite; clock correction information for the satellite positioning system satellite; Doppler information for the signals transmitted by the satellite positioning system satellite; information regarding atmospheric effects on the signal transmitted by the satellite positioning system satellite; and identification of the satellite positioning system satellites that are visible to the satellite positioning system receiver. The digital television signal comprises at least one of the group comprising an American Television Standards Committee (ATSC) digital television signal; a European Telecommunications Standards Institute (ETSI) Digital Video Broadcasting-Terrestrial (DVB-T) signal; and a Japanese Integrated Services Digital Broadcasting-Terrestrial (ISDB-T) signal. The processor determines a pseudo-range between the satellite positioning system receiver and a transmitter of the digital television signal based on a known component of the digital television signal; and determines a position of the satellite positioning system receiver based on the pseudo-range, the signal received from the satellite positioning system satellite and the satellite positioning system aiding information.

The details of one or more implementations are set forth in the accompanying drawings and the description below. Other features will be apparent from the description and drawings, and from the claims.

DESCRIPTION OF DRAWINGS

FIGS. 4A–4D illustrate data segments which have been replaced by codewords using various approaches.

FIGS. 5A–5B illustrate frames in which various data segments have been replaced by codewords.

DETAILED DESCRIPTION

As used herein, the terms "client" and "server" generally refer to an electronic device or mechanism, and the term "message" generally refers to an electronic signal representing a digital message. As used herein, the term "mechanism" refers to hardware, software, or any combination thereof. These terms are used to simplify the description that follows. The clients, servers, and mechanisms described herein can be implemented on any standard general-purpose computer, or can be implemented as specialized devices.

Transmitting Data Using DTV Signals

Figure 1:
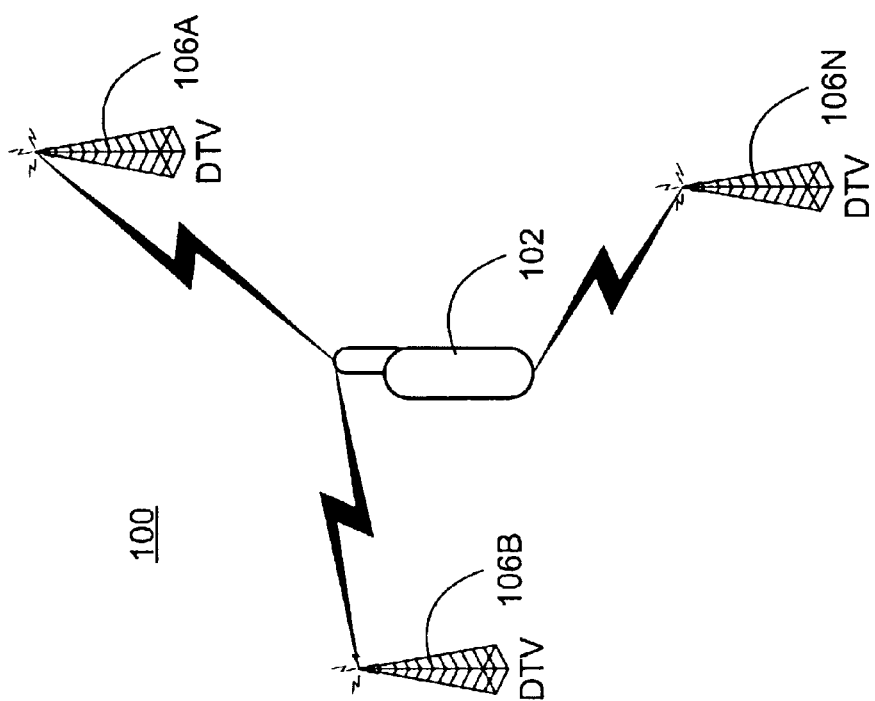
FIG. 1 is a block diagram of a system according to the present invention.

FIG. 1 is a block diagram of an example system 100 according to the present invention. System 100 includes a receiver 102 that receives digital television (DTV) broadcasts from one or more DTV transmitters 106A–N.

One example of a DTV transmitter 106 is a transmission tower which broadcasts DTV signals over the air to receiver 102. Another example is the transmitter for a cable television system, in which case the DTV signals arrive at the receiver 102 via a cable link. Satellite TV systems, also known as Direct Broadcast Satellites (DBS), are another example of digital TV broadcast systems. For example, EchoStar and DirecTV are the primary DBS services in the U.S. market. Generally speaking, there currently are three basic types of commercial digital TV broadcast systems: terrestrial, cable, and satellite. Satellite TV systems are all digital; whereas cable and terrestrial systems are converting to digital from their mostly analog predecessors. These digital TV systems use frame structures that are made up of encoded data packets. These data packets are also referred to as data segments.

The receiver 102 is meant to refer to any object capable of implementing the low data rate channel described below. Receivers 102 may also be capable of receiving the television programming data carried on the DTV signals but this is not required. Receivers 102 may be stationary and/or mobile. Virtually any object which could include a chip or software implementing the robust low data rate channel described below could be a receiver 102. Thus, DTV televisions, pagers, mobile telephones, PDAs, computers, cars and other vehicles would all be examples of receivers 102 if properly equipped.

In system 100, the DTV transmitter 106 transmits digital data to the receiver 102 at a data rate which is significantly less than that of broadcast television programming data. The robust low data rate digital data is inserted into the DTV signal broadcast at the transmitter 106. The DTV signal is received by the receiver 102, which recovers the digital data from the DTV signal.

For example, in one application, the digital data is local street maps showing places of interest near a cell phone. Other applications include data to allow cell phones to compute their own location without the need for external processing, short messages, applications similar to those on pagers, stock quotes, news headlines, TV programming guide, radio programming guide, bus schedules, short text advertisements for stores in the location of the receiver, and all types of low data rate M-commerce information. Based on today's technology, most of the digital data for these applications will consist of short text and/or simple graphs, for example representing maps. Many data broadcast applications can have low data rate versions. For example, the Wireless Application Protocol (WAP), the current generation mobile data technology that reformats Web pages to fit into tiny wireless screens, was introduced in 1999. An even simpler text only version is an example application for a robust low data rate system using DTV signals.

Figure 2:
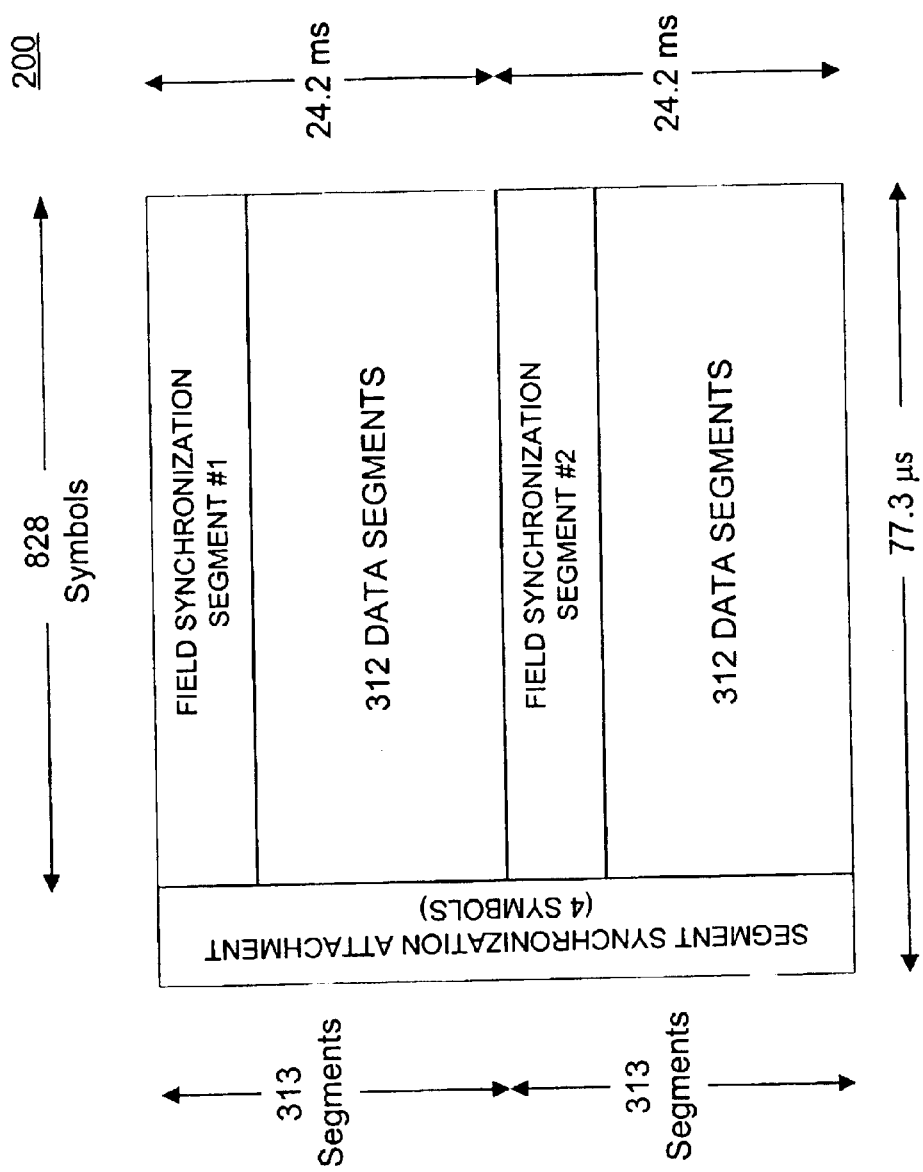
FIG. 2 illustrates the structure of an ATSC frame.

FIG. 2 is a representation of the structure of an ATSC frame from the current ATSC standard. The current ATSC signal is described in "ATSC Digital Television Standard and Amendment No. 1," Mar. 16, 2000, by the Advanced Television Systems Committee, which is incorporated herein by reference in its entirety. The ATSC signal for terrestrial broadcast uses 8-ary vestigial sideband modulation (8-VSB). The symbol rate of the ATSC signal is 10.76 MHz, which is derived from a 27.00 MHz clock. The structure 200 of the ATSC frame is illustrated in FIG. 2. The frame 200 includes a total of 626 segments, each with 828 symbols. Each segment is followed by four symbols that are used for synchronization purposes. These will be referred to as the segment synchronization attachment. In FIG. 2, time travels from right to left. There is a total of 520,832 symbols per frame. Each segment (plus the corresponding segment synchronization attachment) lasts 77.3 microseconds. The 1st and 314th segment in each frame are field synchronization segments. Following each field synchronization segment are 312 data segments.

Each field synchronization segment is one of two fixed, known 828-symbol sequences. The two 828-symbol sequences differ only to the extent that a 63 symbol section is inverted in one sequence relative to the other. Some additional symbols in these field synchronization segments are different for each transmitter. One of these two known field synchronization segments is transmitted every 24.2 milliseconds. These symbol sequences were included as a training sequence to help the ATSC receivers correct for multipath typically found in broadcast channels. The field synchronization segments can be viewed as spread spectrum codewords that are buried in the ATSC data sequence. A spread spectrum codeword is typically detected with correlators (e.g., matched filters). If there are multipath signals of an ATSC broadcast signal at a receiver, then the output of such correlators can provide estimates of the parameters of the multipath signals. Because a field synchronization segment appears once every 24.2 milliseconds, they can be used to provide a periodic snapshot of the multipath signals. For dynamically changing multipath signals, the multipath characteristics during the interim period can be estimated using conventional methods such as blind equalizations or other interpolation schemes.

The data segments are where the television programming data is carried. Each data segment corresponds to a 188-byte data packet in the MPEG-2 transport layer. Each 188-byte data packet is expanded into 828 3-bit coded data symbols using a combination of a Reed-Solomon encoder, interleaver, and rate ⅔ trellis encoder. Data segments may also be used to carry other information such as web content from the Internet or may be unused in which case the data segment is said to contain a null packet.

The segment synchronization attachment is the same for all segments. It consists of the four symbol sequence (−1, 1, 1, −1) and is typically used for segment synchronization.

Implementations of the invention can be extended to use future enhancements to DTV signals. For example, the ATSC signal specification allows for a high rate 16-VSB signal primarily for digital cable television. However, the 16-VSB signal has the same general frame structure as the 8-VSB signal, using field synchronization segments and data segments. Therefore, it is straightforward to extend the 8-VSB examples shown below to the 16-VSB signal.

The 8-VSB signal is constructed by filtering. The in-phase segment of the symbol pulse has a raised-cosine characteristic, as described in J. G. Proakis, *Digital communications*, McGraw-Hill, $3^{rd}$ edition, 1995. The pulse can be described as $$p(t) = \text{sinc}\left(\frac{\pi t}{T}\right) \frac{\cos\left(\frac{\pi \beta t}{T}\right)}{1 - \frac{4\beta^2 t^2}{T^2}} \quad (1)$$

where T is the symbol period $$T = \frac{1}{10.76 \times 10^6} \quad (2)$$

and $\beta=0.5762$. This signal has a frequency characteristic $$P(f) = \begin{cases} T & \left(0 \le |f| \le \frac{1-\beta}{2T}\right) \\ \frac{T}{2}\left\{1 + \cos\left[\frac{\pi T}{\beta}\left(|f| - \frac{1-\beta}{2T}\right)\right]\right\} & \left(\frac{1-\beta}{2T} \le |f| \le \frac{1+\beta}{2T}\right) \\ 0 & \left(|f| > \frac{1+\beta}{2T}\right) \end{cases} \quad (3)$$

from which it can be seen that the one-sided bandwidth of the signal is $(1+\beta)10.762237$ MHz=5.38 MHz+0.31 MHz. In order to create a VSB signal from this in-phase pulse, the signal is filtered so that only a small portion of the lower sideband remains. This filtering can be described as:

$$P_v(f) = P(f)(U(f) - H_\alpha(f)) \quad (4)$$

where $$U(f) = \begin{cases} 1, & f \ge 0 \\ 0, & f < 0 \end{cases} \quad (5)$$

and $H_\alpha(f)$ is a filter designed to leave a vestigial remainder of the lower sideband. The filter satisfies the characteristics $H_\alpha(f) = -H_\alpha(f)$ and $H_\alpha(f)=0$, $f>\alpha$. The response $U(f)P(f)$ can be represented as $$U(f)P(f) = \frac{1}{2}\left(P(f) + j\check{P}(f)\right) \quad (6)$$

where $\check{P}(f) = -j\, \text{sgn}(f)P(f)$ is the Hilbert transform of $P(f)$. The VSB pulse may be represented as $$P_v(f) = \frac{1}{2}X(f) + \frac{j}{2}\left(\check{X}(f) + 2X(f)H_\alpha(f)\right) \quad (7)$$

and the baseband pulse signal $$P_v(t) = \frac{1}{2}x(t) + \frac{j}{2}\left(\check{x}(t) + x_\alpha(t)\right) = p_{vi}(t) + jp_{vq}(t) \quad (8)$$

where $p_{vi}(t)$ is the in-phase component, $p_{vq}(t)$ is the quadrature component, and $$x_\alpha(t) = 2\int_{-\alpha}^{\alpha} X(f)H_\alpha(f)e^{j2\pi ft}\,df \quad (9)$$

Before the data is transmitted, the ATSC signal also embeds a carrier signal, which has ~11.5 dB less power than the data signal. This carrier aids in coherent demodulation of the signal. Consequently, the transmitted signal can be represented as:

$$s(t) = \sum_n C_n\{p_{vi}(t-nT)\cos(\omega t) - p_{vq}(t-nT)\sin(\omega t)\} + A\cos(\omega t) \quad (10)$$

where $C_n$ is the 8-level data signal.

Figure 3:
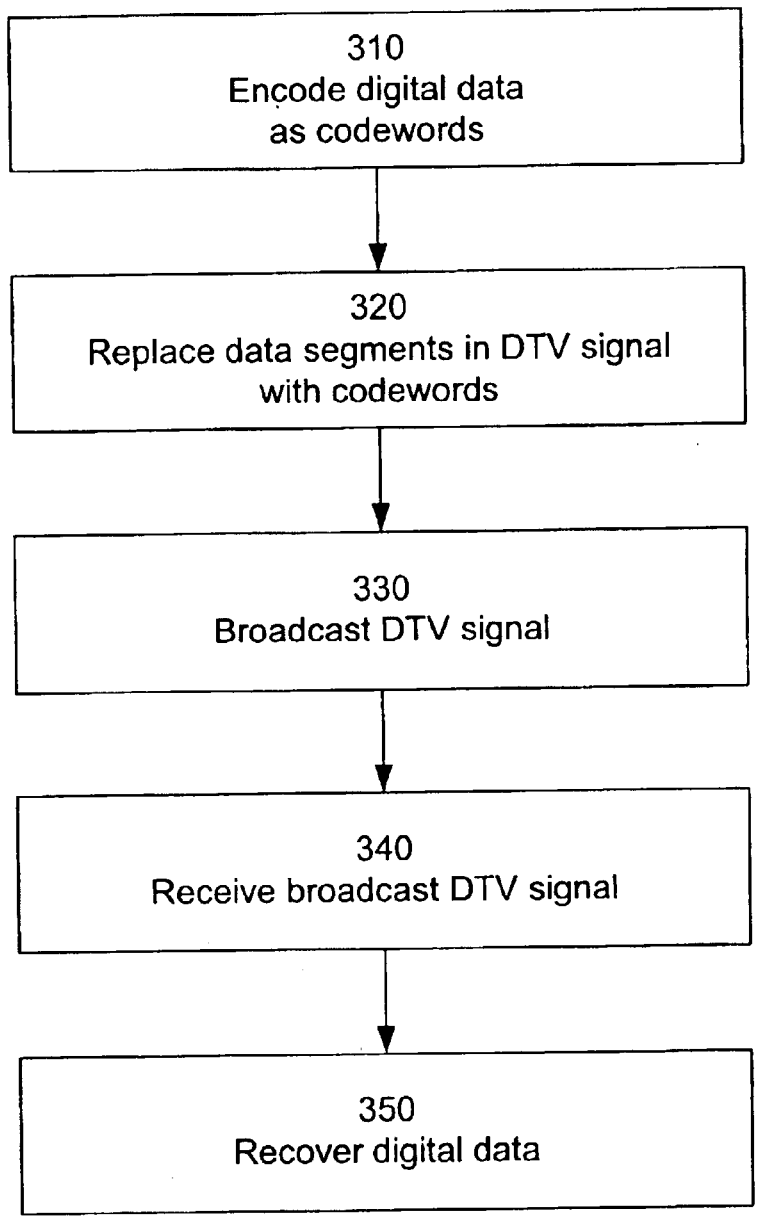
FIG. 3 is a flow diagram illustrating a method for transmitting and receiving low data rate data using an ATSC DTV signal.

FIG. 3 is a flow diagram illustrating a method 300 for transmitting digital data using ATSC frames 200. In general, some of the data segments are replaced by codewords representing the digital data to be transmitted. In more detail, the digital data to be transmitted is encoded 310 as codewords. The codewords replace 320 data segments within the DTV signal. The DTV transmitter 106 broadcasts 330 the DTV signal containing the codewords. The receiver 102 receives 340 the broadcast signal, from which the digital data is recovered 350.

Consider first a simple example in which one data segment in each frame is replaced by one of two possible codewords, each of which is 828 symbols long. In other words, each codeword is the same length as a data segment. One codeword represents binary 0 and the other represents binary 1. The two codewords preferably are orthogonal to each other. In this simple example, one bit of data can be transmitted per ATSC frame, for a data rate of approximately 21 bits per second (bps).

If the two codewords are orthogonal, a simple non-coherent receiver has the same performance as the common non-coherent reception of binary frequency shift keyed signals. Thus, in an ideal white Gaussian noise channel model, the bit error probability is given by $$P_b = 0.5\, \exp\{-E_b/2N_o\} \quad (11)$$

where $N_o$ is the double sided noise spectral density and $E_b$ is the energy per bit. In this case, $E_b$ for the single bit being transmitted is the energy at the receiver for the entire 828-symbol segment. It is equal to the TV transmitter power at the receiver multiplied by the 77.3 microseconds of the segment duration. Thus, $E_b$ is 29 dB greater than the energy for each DTV broadcast symbol.

As a result, the digital data can be recovered from broadcast signals that are much weaker than is acceptable for TV reception. For example, signals which are 30 to 40 dB weaker than needed for the reception of digital TV signals may be suitable for use with these low data rate channels. This, in turn, means that the digital data can be recovered over a much wider range than the typical DTV reception range. In addition, reception of this low data rate channel is possible in many indoor locations where broadcast TV reception is difficult.

Another advantage of this approach is that reception of the low data rate signal can be accomplished with receivers that are much simpler than the standard DTV receivers, as will be discussed in further detail below. For this type of data transmission, simple non-coherent energy detection of codewords using correlators at the receiver is appropriate. This type of receiver is simple in design, small in size, and low in energy consumption.

Another advantage is that significant expenses are not required to implement the transmitter either, as will be discussed in further detail below. Many DTV transmitters already include standard equipment at the broadcast station for replacing individual segments in the DTV signal. This equipment may be used to replace certain segments with the field synchronization segments or to replace null MPEG packets which arise, for example, because there is no TV programming data to send at the transmission times of these data segments. To implement the required transmitter functionality, this equipment need only be modified to replace certain data segments with codewords instead.

Figure 4A:
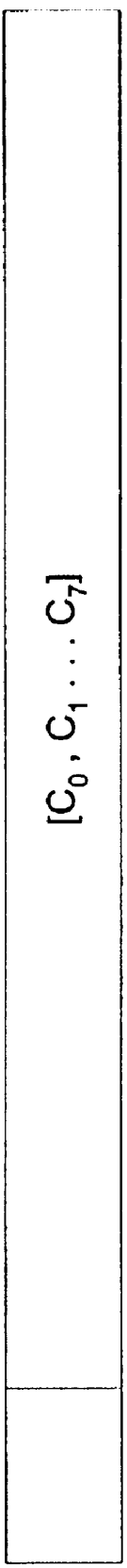

The simple example given above results in a data rate of approximately 20 bps. The data rate can be increased in a number of ways. For example, more than one bit can be carried by each replaced 828-symbol data segment in a frame. In one approach, more than two codewords are used. For example, the incoming digital data may be divided into bit sequences each of which is three bits long. Each of these bit sequences is encoded as a codeword selected from a set of eight possible 828-symbol codewords. Each of the eight codewords corresponds to one of the eight possible 3-bit sequences. The eight codewords preferably are orthogonal to each other in order to facilitate reception. Depending on the 3-bit sequence, one of the eight codewords is inserted into the DTV signal, replacing the corresponding data segment in a frame, as shown in FIG. 4A. Here the data rate is now approximately 62 bps. In the notation used, a codeword is represented by the $C_n$ and the notation $[C_0, \ldots C_{N-1}]$ represents one codeword selected from the set of N codewords. Typically, one codeword selected from the finite set of N codewords is used to replace a data segment. If N=8 then a codeword would represent one of the eight possible 3-bit sequences. A lookup table can be used to convert from the 3-bit sequences to the corresponding codewords. In a generalization of this example, $2^N$ codewords can be used to replace bit sequences which are N bits long.

Generally, the set of codewords should be selected so that they have good correlation properties that minimize reception errors. In additional to being orthogonal, the codewords preferably should have low time shifted crosscorrelation and small side lobes in their autocorrelation function. In general, codewords based on multi-amplitude symbols will result in better correlation properties than those based on binary amplitude symbols. Such sets of codewords have been studied extensively in various applications, especially in spread spectrum communication systems, with the most popular commercial application being the Code Division Multiple Access (CDMA) system used in the IS-95 cell phone standard in the United States. Since the 8-VSB ATSC standard is based on 8 level modulation, codewords using multi-amplitude symbols may be suitable for this standard. More specifically, 4-level or 8-level symbols can be used instead of binary (2-level) symbols. The set of possible codewords may also include codewords which do not represent bit sequences. For example, the 3-bit sequences may be represented by a set of nine codewords, where the ninth codeword represents "no data present."

Figure 4B:
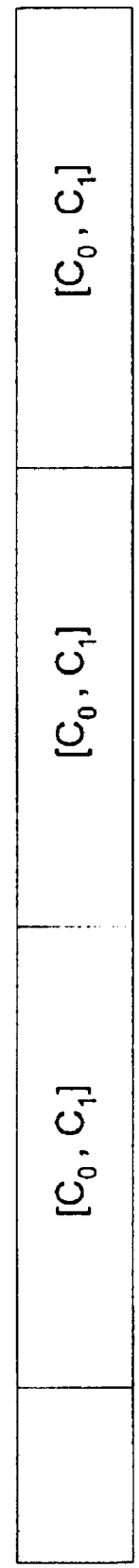

In an alternate embodiment, multiple codewords can be used to replace a single data segment. As shown in FIG. 4B, another way to implement three bits per data segment is to subdivide the data segments into three subsegments, each of which is 828/3=276 symbols long. Each of these subsegments is used to represent one bit and is replaced by one of two possible 276-symbol codewords. If one data segment per frame is replaced by such a set of three codewords then the data rate is approximately 62 bps.

The reverse is also possible. In other words, a single codeword may occupy more than one data segment. For example, if more robust transmission is desired, a 3×828=2,484-symbol codeword may be used, with one of two codewords replacing three data segments, as shown in FIG. 4C.

Other alternatives will be apparent. In FIG. 4A, the digital data was divided into bit sequences, all of which were the same length. In an alternate approach, the digital data is divided into bit sequences of varying lengths, with each bit sequence mapped to a corresponding codeword. The codewords could also be of varying length. Nor is it necessary for all 828 symbols of a data segment to be replaced by codewords. For example, five bits per data segment could be encoded as five 160-symbol codewords, for a total of 800 symbols per data segment, as shown in FIG. 4D. However, this approach generally is not favored since current technology tends to process DTV signals on a segment by segment basis, so the approach in FIG. 4D effectively wastes the remaining 28 symbols in the data segment. In general, however, the codewords typically will have a significantly lower data rate than the data segments which they replace. Generally speaking, as the number of bits per codeword is increased, the robust low data rate receiver becomes more complex and its performance degrades.

The overall data rate can also be increased by increasing the number of data segments per frame used for the low data rate channel. Under the current ATSC standard, if all data segments were used to transmit television programs, the resulting DTV signal would have a data rate of approximately 19.2 Mbps. Current TV signals typically do not require this much bandwidth. For example, HDTV typically requires about 12–15 Mbps and standard definition TV typically requires about 3–5 Mbps. This leaves anywhere from 20–80% of the overall capacity as unused. If 20% of the overall capacity is used for the low data rate channel, then 125 data segments per data frame will be used for this channel. If 5 bits are encoded on each data segment, the overall data rate will be approximately 12.5 Kbps. By doing this, approximately 4 Mbps of television programming is replaced by a 12.5 Kbps low data rate channel, but the low data rate channel is much more robust and can be received over longer ranges using simpler receiver technology.

The selection of which and how many data segments are to be replaced can also be implemented in a number of ways. A straightforward approach is to replace preselected data segments. For example, in FIG. 5A, data segments 10–50 of each frame are dedicated to the low data rate channel and these are the data segments which are replaced by codewords. In this case, the receiver can be further simplified. The receiver knows a priori that only data segments 10–50 can contain codewords. So it need only test these data segments for codewords. Furthermore, if a codeword is always present in these data segments, then the receiver need only determine which of the possible codewords is the most likely one to have been transmitted. In other words, if there are eight possible codewords (e.g., representing different 3-bit sequences) then the receiver need only decide which of the eight codewords was transmitted in the received data segment intervals. It need not determine whether a codeword is present.

Figure 5B:
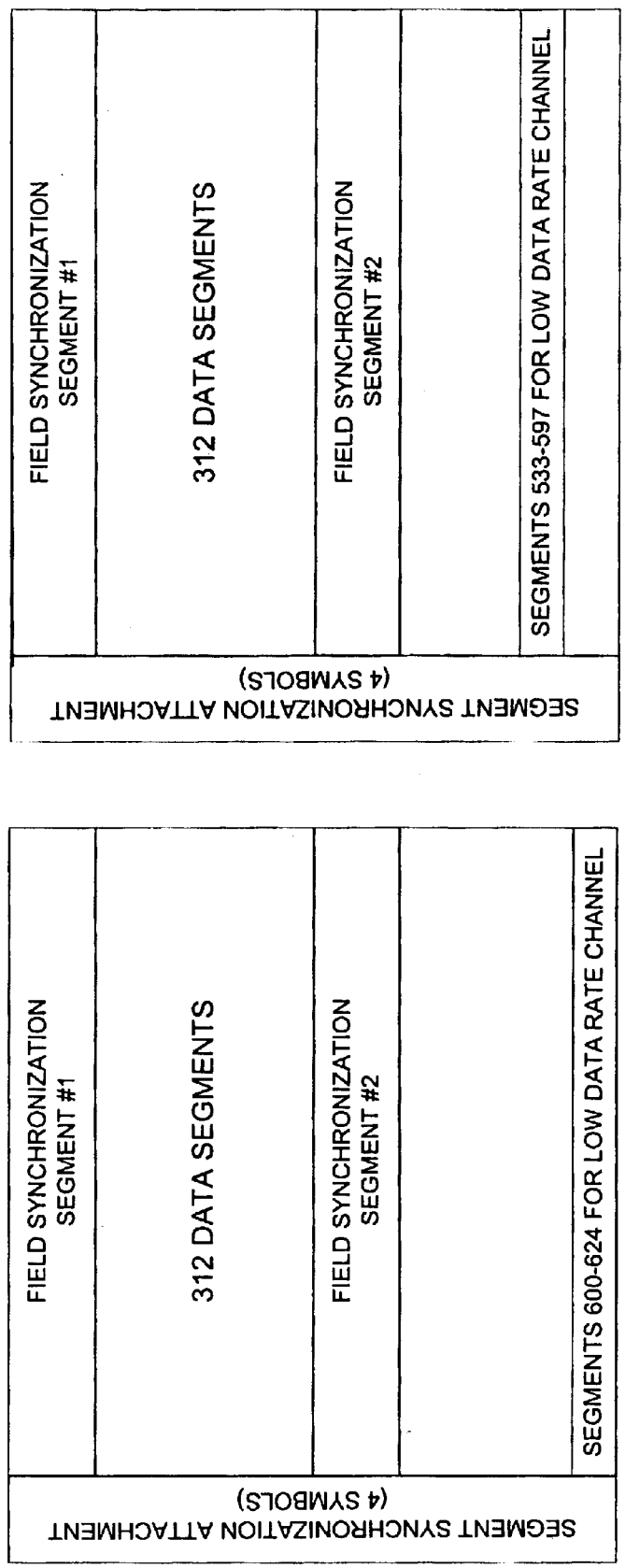

In an alternate approach, data segments are replaced by codewords on an as-available basis. For example, the transmitter may determine whether a data segment contains a data packet or a null packet. That is, the transmitter determines whether the data segment is used or unused. If it contains data, then that data segment is not used for the low data rate channel. Only unused data segments, typically referred to as "null packets," are replaced by codewords. In FIG. 5B, data segments 600–624 of frame 1 are not being used and are replaced by codewords. In the next frame, data segments 533–597 are not being used and are replaced by codewords. In this case, the receiver may not know a priori which data segments contain codewords. Using correlation thresholds, the receiver must first estimate which data segments contain codewords.

These two approaches can also be combined. For example, data segments 10–50 may be dedicated to the low data rate channel and any additional unused data segments may also be available for the low data rate channel.

Figure 6:
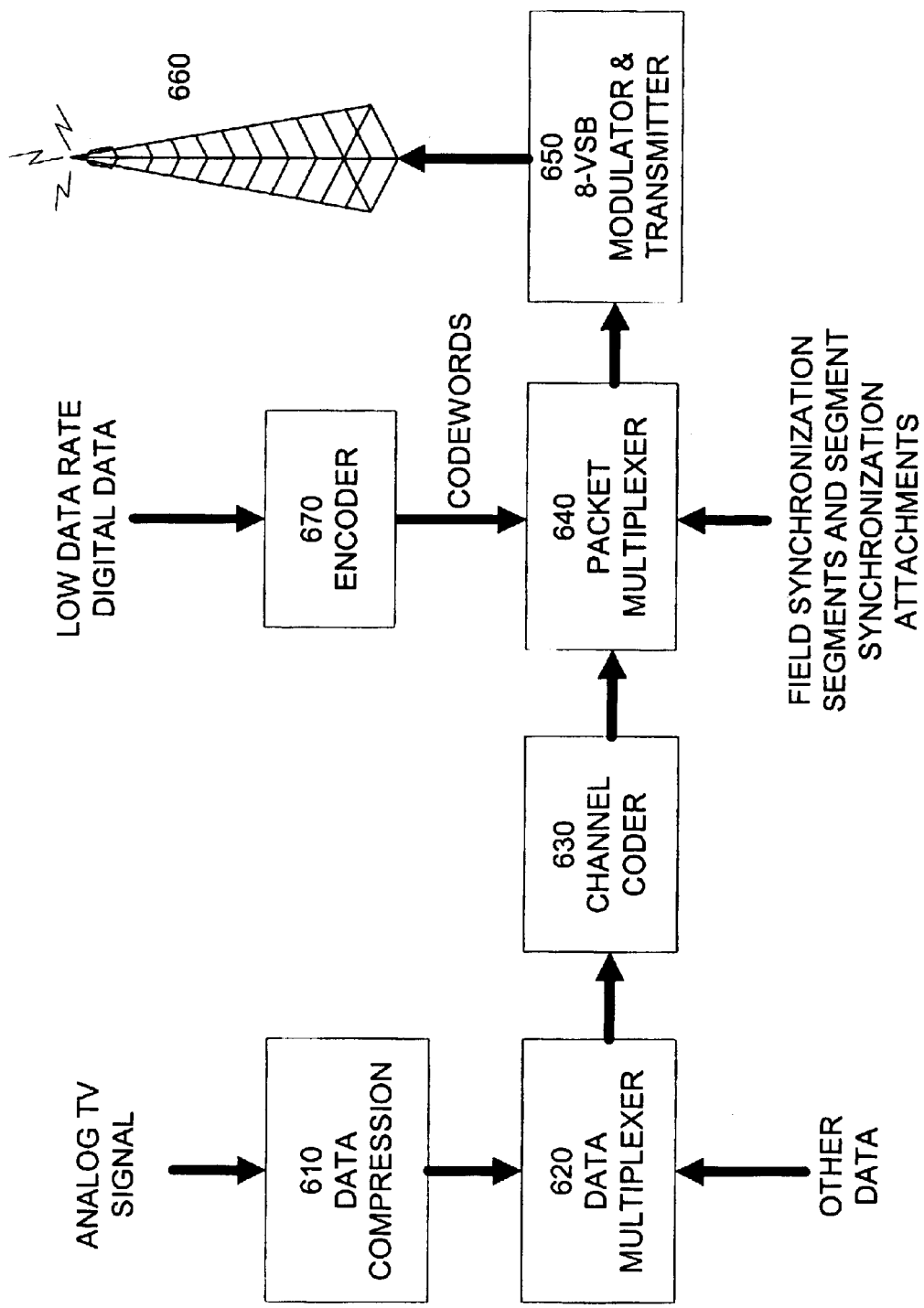
FIG. 6 is a block diagram of a DTV transmitter.

FIG. 6 is a block diagram of a DTV transmitter 106. This transmitter 106 includes the following elements, coupled in series: data compression engine 610, data multiplexer 620, channel coder 630, packet multiplexer 640 (for field synchronization segments, segment synchronization attachments, and codewords), 8-VSB modulator and transmitter 650 and transmission tower 660. The transmitter 106 also includes a data encoder 670 coupled to the packet multiplexer 640.

The transmitter 106 operates as follows. An analog television signal is compressed by compression engine 610. MPEG 2 is the data compression standard used by the current ATSC standard. This approach allows broadcasters to transmit a TV signal with data rates typically from 3 Mbps to 15 Mbps depending on the desired reception quality. In FIG. 6, other data entering the data multiplexer 620 could include a television signal already in digital form in which case the analog television signal entering 610 may not exist.

Since the standard 6 MHz bandwidth of a single analog TV channel can transmit 19.2 Mbps using the ATSC digital format, converting to digital provides broadcasters with extra capacity for sending other data and even multiple TV channels per 6 MHz channel. The data multiplexer 620 combines multiple streams of data into a single ATSC signal. Examples of other types of data include additional TV programming which is already in digital form and program guide information. Since data is packetized over the DTV broadcast signal, any type of digital data can be transmitted over the TV programming channel at the 19.2 Mbps data rate. There have been proposals to sent video rich forms of Internet web traffic over such TV programming channels.

Channel coder 630 encodes the resulting data packets in order to correct for channel errors. In a common approach, channel coder 630 implements a combination of Reed-Solomon error correction encoding, interleaving, and trellis encoding.

The ATSC standard for terrestrial broadcast uses 8-VSB modulation with 3-bit symbols in the form of 8 levels of amplitude. After channel coding, the coded data of 8-level symbols is divided into data segments.

The packet multiplexer 640 is the device that can replace data on a segment by segment basis. The sequence of 8-level symbols is sent to the 8-VSB modulator and transmitter 650. The modulator 650 applies the 8-VSB modulation. The transmitter 50 then broadcasts the resulting DTV signal via transmitter tower 660.

For the low data rate channel, the data encoder 670 generates the codewords from the incoming digital data. For example, the data encoder 670 can convert bit sequences to codewords using a lookup table. For applications which are not real-time, both the incoming bit sequences and/or outgoing codewords may be stored and subsequently retrieved from memory.

As an example, in the case of 3-bit sequences being translated to 828-symbol codewords, the data encoder 670 divides the incoming digital data into 3-bit sequences and then translates these into the corresponding codewords. In one implementation, this is accomplished by a lookup table that has a 3-bit input and outputs the corresponding codeword. The codewords from data encoder 670 are inserted into the ATSC frames at the transport layer by the packet multiplexer 640. Inserting codewords is very similar to inserting field synchronization segments, except that the actual data to be inserted is different. Since the packet multiplexer 640 almost certainly is already inserting field synchronization segments, it is straightforward to modify the existing packet multiplexer 640 to also insert codewords.

In one physical implementation, blocks 610–640 are implemented as equipment located at the television broadcast station. The modulator and transmitter 650 are located in close proximity to the tower 660, for example at the base of the tower. Other implementations will be apparent. For example, some or all of blocks 610–640 may be located at other physical locations, particularly if the television program is not a live broadcast. In this case, the prerecorded program may be processed at different locations.

Figure 7:
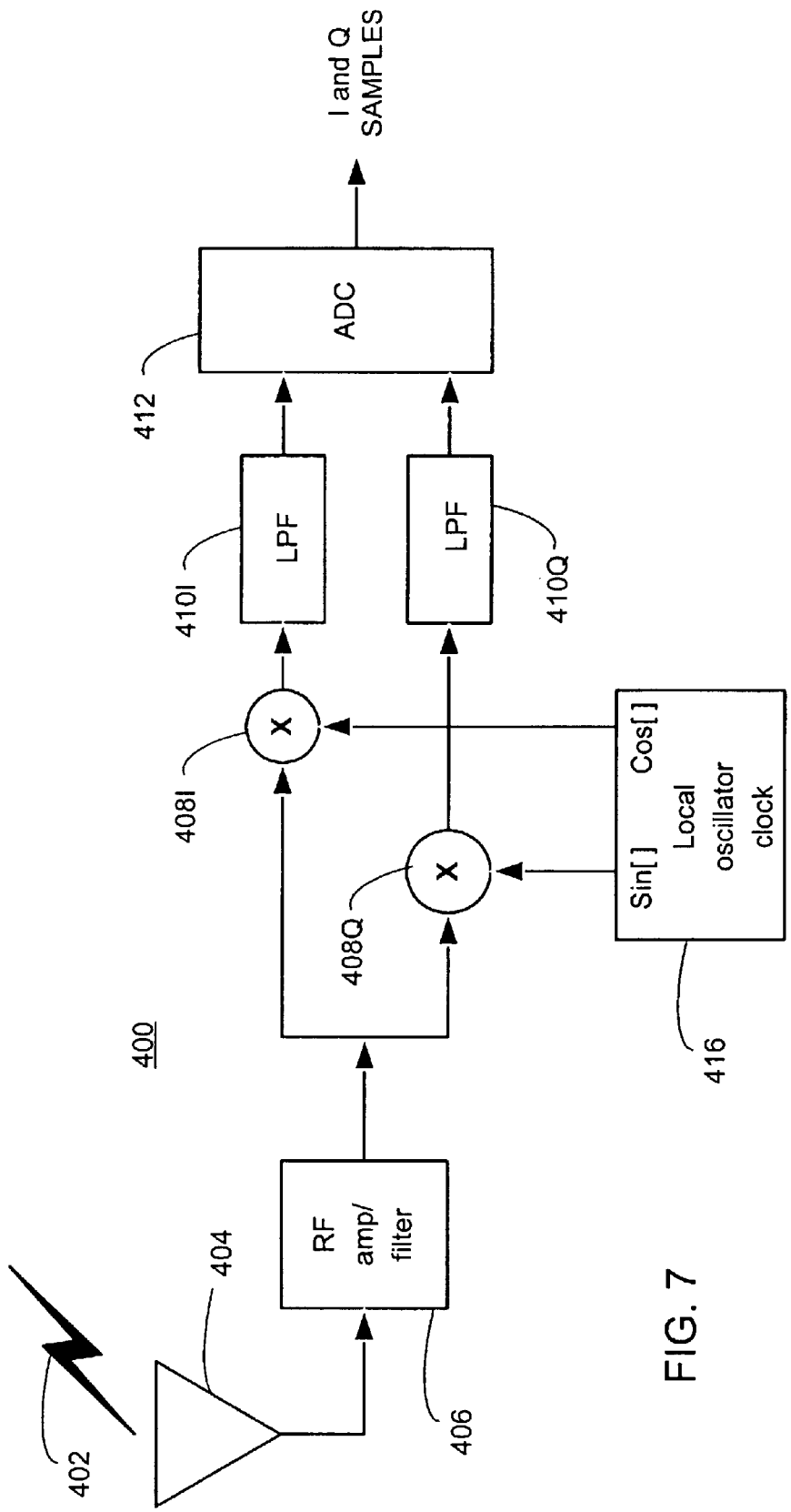
FIG. 7 is a block diagram of a front end for use in a receiver.

FIGS. 7–12 illustrate various aspects of receiver 102. The receiver 102 recovers the digital data from the codewords embedded in the broadcast DTV signal. FIG. 7 is a block diagram of a front end 400 for use in the receiver 102. The sampler 400 takes samples of the received DTV signal. In the approach shown in FIG. 7, the DTV broadcast signal 402 is received by an antenna 404, which is followed by filters and amplifiers 406. The filtered and amplified DTV broadcast signal is then converted into in-phase and quadrature baseband signals by a local oscillator 416, mixers 408I and 408Q, and low pass filters 410I and 410Q. In more detail, the DTV broadcast signal is split into two signals. Each mixer 408I, 408Q multiplies one of the DTV broadcast signals with the sin or cosine component of the local oscillator 416, respectively. Each multiplied signal is then low pass filtered by filter 410I or 410Q, respectively, resulting in the baseband I and Q components of the received DTV broadcast signal. This is sampled and quantized by the analog to digital converter (ADC) 412. The digital samples of the baseband I and Q output of the ADC can be stored in memory for later processing, processed immediately by a digital processor, or enter digital circuits that perform digital processing in hardware. FIG. 7 is a typical front end for a receiver. In particular FIG. 7 can also be the front end of a conventional DTV receiver that receives TV programming data. Other types of fronts ends will be apparent.

Figure 8:
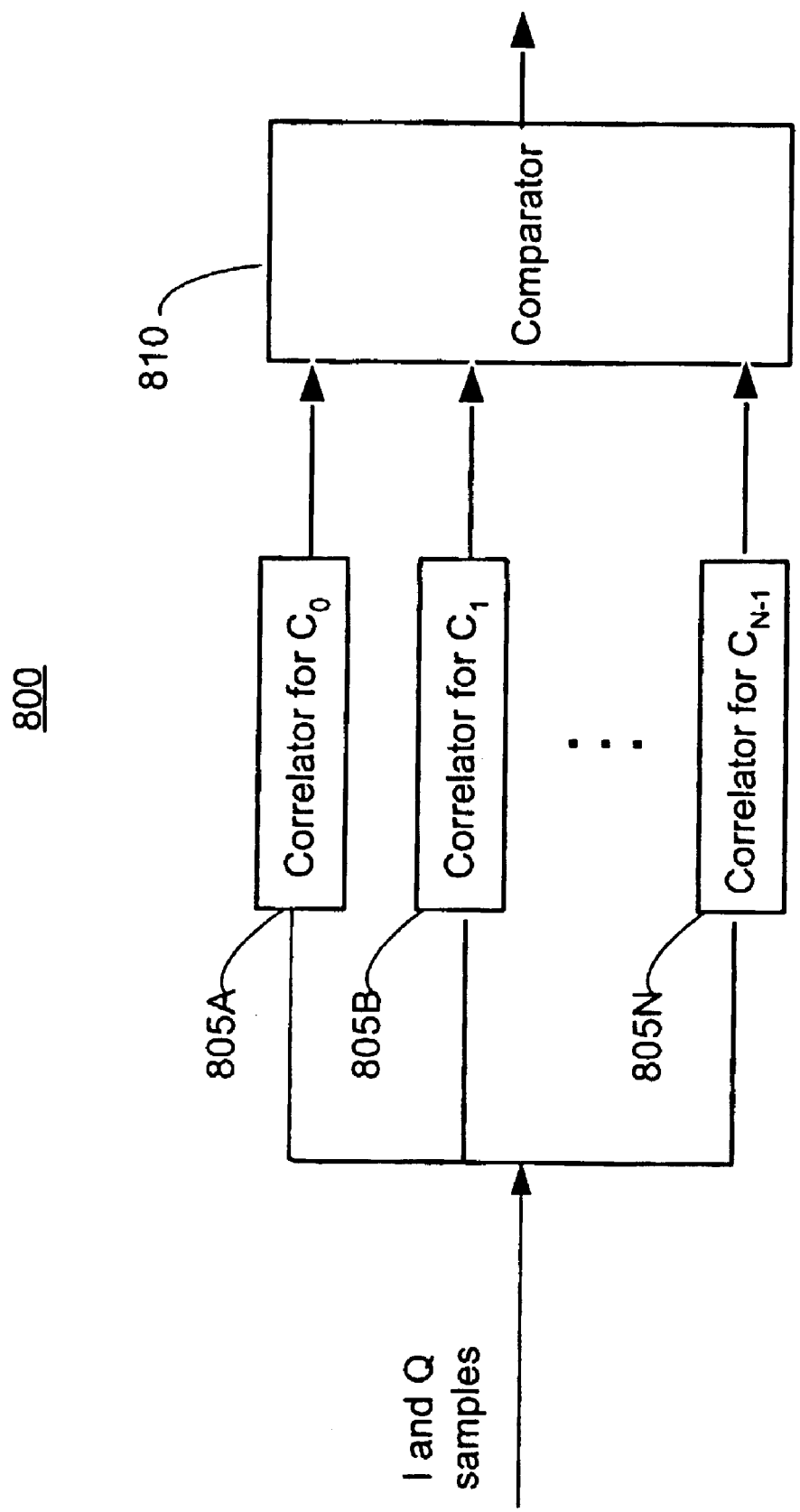
FIG. 8 is a block diagram of a back end based on a bank of correlators.

FIG. 8 is a block diagram of a back end for use in receiver 102. The back end 800 receives the digital I and Q samples from the front end of the receiver. For convenience, the I and Q samples are shown by a single line in FIG. 8 rather than separate lines for I and Q. The back end 800 includes a bank of correlators 805A–805N, with one correlator 805 for each of the possible codewords. FIG. 8 illustrates the general case where there are N possible codewords and N corresponding correlators 805. Each correlator 805 correlates the incoming samples against a template for the corresponding codeword. In one implementation, the template is a matched filter for the codeword. Thus, the output of correlator 805A provides a measure of the likelihood that the data segment being tested contains codeword $C_0$. Similarly, the correlation produced by correlator 805B measures the likelihood of codeword $C_1$ and so on. The bank of correlators 805 is coupled to a comparator 810, which determines which of the correlations is the largest. The data bits of the selected codeword are then output. For example, if correlator 805B produces the strongest correlation, then the bit sequence corresponding to codeword $C_1$ is recovered by the receiver.

Multipath is common in radio channels. At the receiver, multipath signals are multiple copies of the transmitted signal each with a different delay. This results in the correlator output having multiple correlation peaks of various sizes corresponding to the transmitted codeword. A receiver can take advantage of multipath and combine all of the multipath related correlation peaks out of each codeword correlator and then do the comparison among all such codeword correlators. This receiver would perform better than a conventional receiver that would only look at the correlator output at a particular instant in time. This type of receiver can be implemented by changing the basis for comparision in comparator 810.

Figure 9:
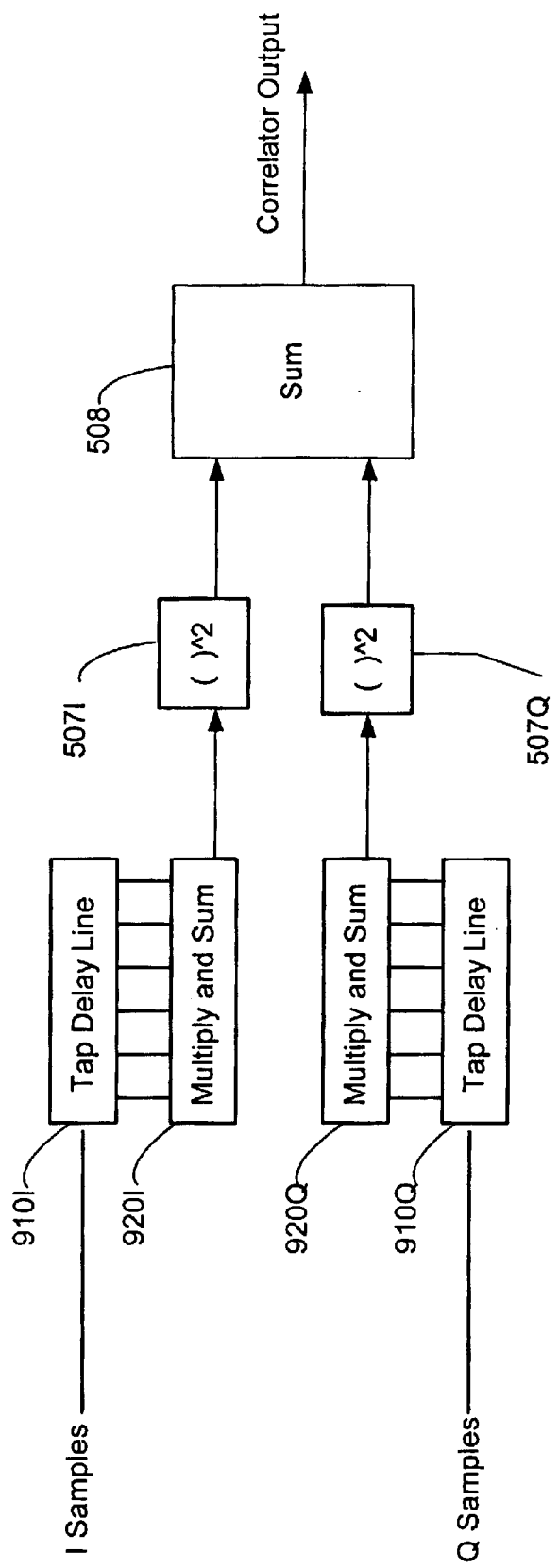
FIG. 9 is a block diagram of one correlator.

The correlators 805 shown in FIG. 8 can be implemented in many different ways. FIG. 9 is one example of a correlator 900. The I samples from the front end enter the tap delay line 910I and the Q samples from the front end enter the tap delay line 910Q. The codeword determines which of the samples in the tap delay lines 910I and 910Q are multiplied and summed in the devices 920I and 920Q. The tap delay lines 910 are long enough to store the samples for an entire codeword (e.g., an entire data segment if there is a one to one replacement of data segments by codewords). At each sample time, a new I and Q sample from the ADC 412 enters the tap delay lines 910I and 910Q. The parallel outputs from the tap delay lines 910I and 910Q flow to the multiply and sum devices 920I and 920Q, respectively. The outputs of these devices are squared in the square law devices 507I and 507Q and summed again in summer 508. Thus, correlator 900 generates an output for every sample time. In one embodiment of back end 800 of FIG. 8, the correlator 900 of FIG. 9 is repeated N times, once for each of the correlators 805 in FIG. 8. The multiply and sum circuit (920I and 920Q) is varied for each correlator 805, thus implementing correlations against different templates.

Figure 10:
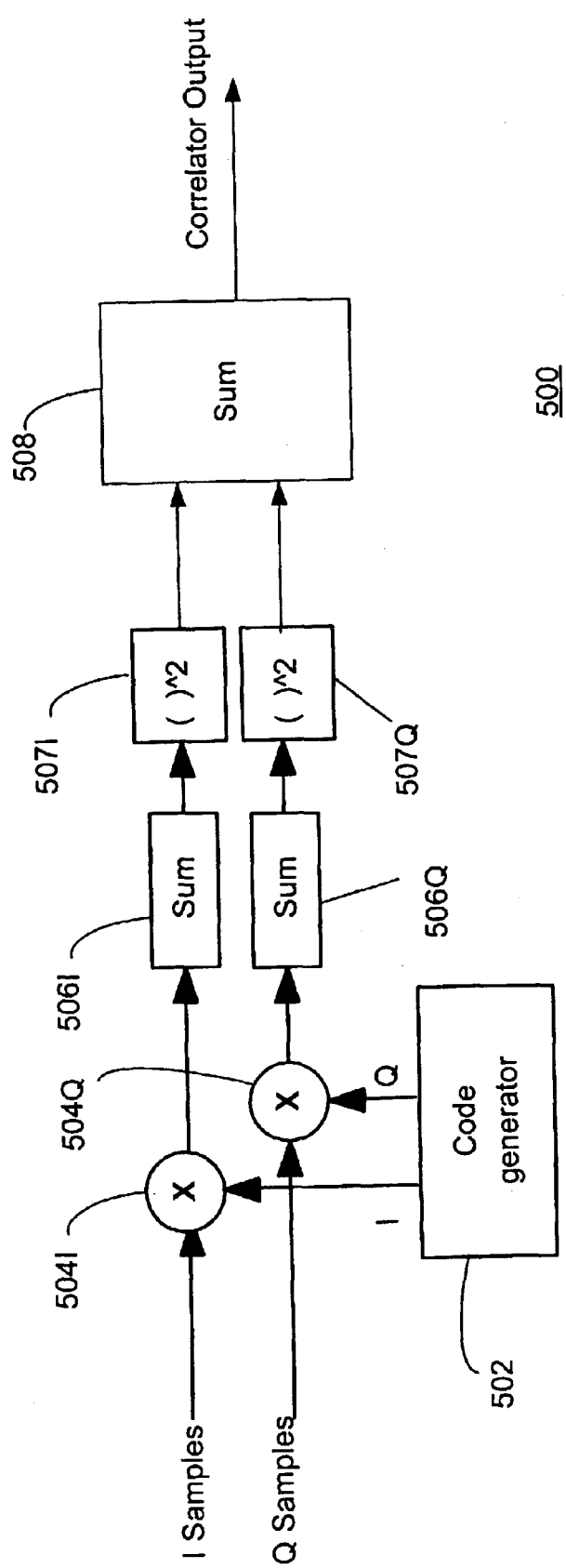
FIG. 10 is a block diagram of another correlator.

FIG. 10 illustrates another type of correlator 500 that can be used in FIG. 8. This is a serial correlator. The I and Q samples from the front end are multiplied by mixers 504I and 504Q, respectively, against the I and Q components of the code generator 502 which are uniquely determined by the codeword. The code generator 502 is synchronized with the arrival time of the samples being received by the back end. The multiplied I and Q samples are summed by summers 506I and 506Q. The sum is taken over the time interval of a codeword (e.g., over one data segment if there is a one to one replacement of data segments by codewords). These sums are squared in square law devices 507I and 507Q and then added together in the summer 508. Correlator 500 produces one output for the entire correlation. That is, correlator 500 generates the correlation function at a specific instant in time (typically, the instant when a correlation peak is expected). In contrast, correlator 900 of FIG. 9 generates samples of the correlation function at different times. In one embodiment of back end 800 of FIG. 8, the correlator 500 of FIG. 10 is repeated N times, once for each of the correlators 805 in FIG. 8. The templates for the different codewords are generated by varying the code generator 502.

In yet another embodiment, the back end of receiver 102 is implemented by a digital signal processor programmed to perform the required correlations.

Figure 11:
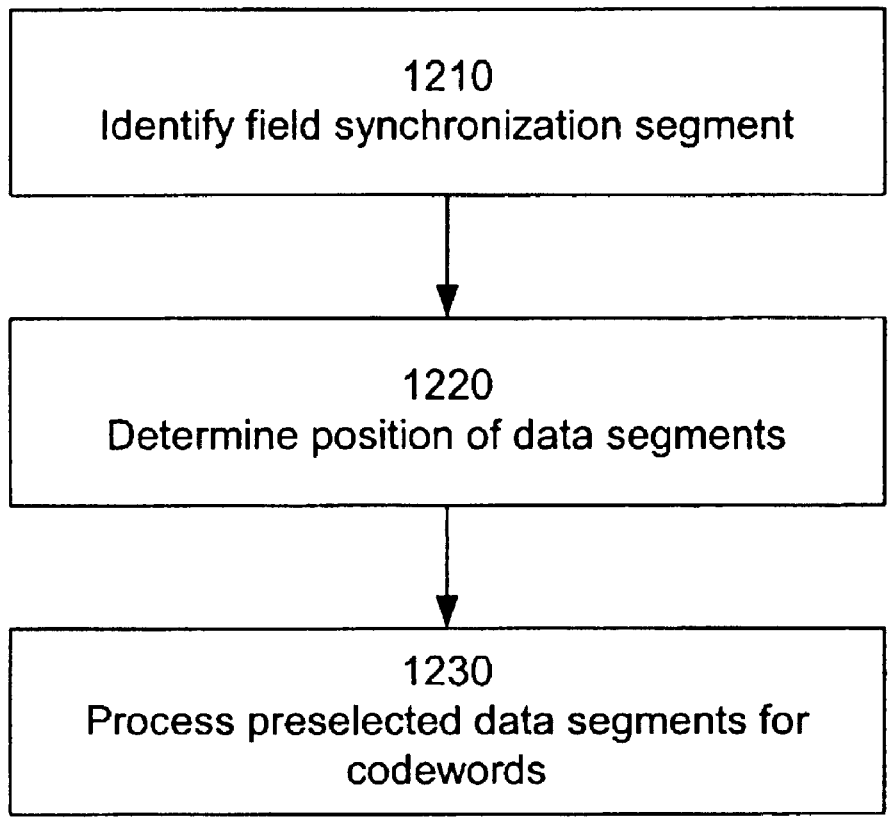
FIG. 11 is a flow diagram illustrating one method of recovering digital data based on establishing framing.

FIG. 11 is a flow diagram illustrating one method of recovering digital data by establishing framing of the incoming ATSC signal. The receiver 102 establishes framing by identifying 1210 the field synchronization segment within the ATSC frames. This can be accomplished, for example, by using a correlator 900 of FIG. 9 where the multiply and sum devices 920I and 920Q are designed to implement correlation against the field synchronization segments. Establishing framing simplifies the subsequent data recovery because individual data segments can then be identified and the temporal location of codewords will be known by the receiver 102. If framing was not established, the receivers would have to detect codewords without knowing the location of the beginning and end of each codeword at the receiver 102. This is more complex, although it could still be achieved, for example by using correlation or matched filtering but taking into account the unknown timing as to when codewords are being received by the receiver.

In more detail, recall that a field synchronization segment occurs once every 313 segments (or once every 24.4 ms) in the ATSC format of FIG. 2. Initially, a continuous stream of symbols is received by receiver 102. It is not known where data segments start and end, nor is it know which of the data segments is the field synchronization segment. To establish framing, both of these ambiguities are removed.

Figure 12:
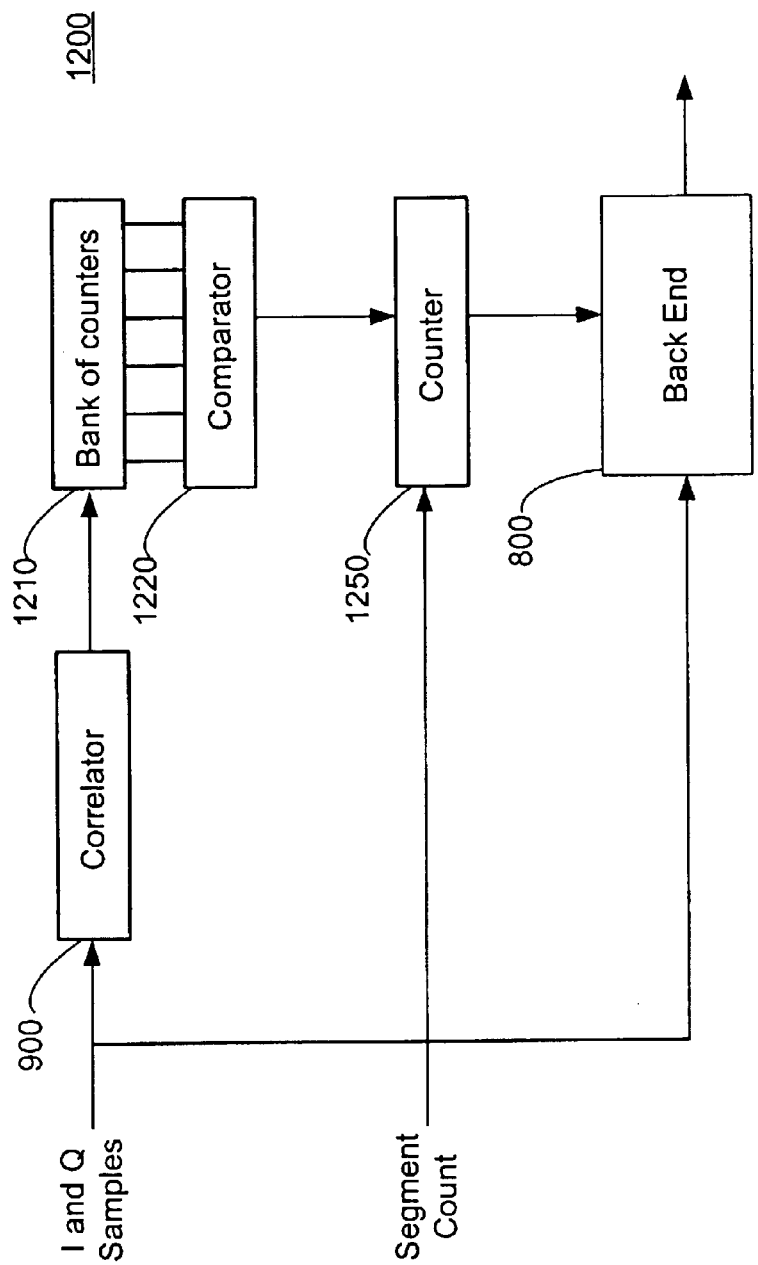
FIG. 12 is a block diagram of a back end for establishing framing.

FIG. 12 is a block diagram of a device 1200 which removes this ambiguity. This device 1200 includes back end 800, which will recover the digital data once framing is established. The rest of the device 1200 includes the following coupled in series: a correlator 900, a bank of counters 1210 and a comparator 1220. These elements are used to identify the field synchronization segment. The counter 1250 is used to synchronize back end 800. The block diagram is functional. Various implementations of the same functionality will be apparent.

The framing function of device 1200 operates as follows. The incoming stream of symbols is arbitrarily divided into 24.2 ms blocks, which are further divided into 313 intervals of 77.3 us each. The 24.2 ms blocks correspond to ATSC half-frames and the 77.3 us intervals correspond to data segments. In other words, a field synchronization segment will occur once during each 24.2 ms block and the field synchronization segment will last for one time interval of 77.3 us (although it might span the boundary of two adjacent 77.3 us intervals since the start and end of data segments is not yet known).

The correlator 900 correlates one incoming 77.3 us time interval against a "generic" field synchronization segment. The template is "generic" in the sense that the correlator 900 detects the 757 symbols which are common to all field synchronization segments (recall that some symbols vary between different field synchronization segments). The correlator 900 has an output for each sample time. That is, it outputs a correlation function sampled at many different points in time. This is useful since the exact location of the correlation peak is not yet known.

In the bank of counters 1210, one counter is assigned to each of the 313 time intervals. During each of the time intervals, the correlator output samples are compared to a threshold. If the output of correlator 900 exceeds the threshold, the counter 1210 for that time interval is incremented. This is repeated, cycling through the counters 1210 repeatedly, as each of the 313 intervals appear once every 24.4 milliseconds Thus, each counter 1210 counts the number of times each 313th time interval (e.g., the 1st, 314th, 627th, etc. time intervals for counter 1; the 2nd, 315th, 628th, etc. time intervals for counter 2, etc.) exceeds the threshold. Over time, the counter 1210 with the largest count will be the one corresponding to the field synchronization segment. Comparator 1220 determines which count is the largest, thus identifying the field synchronization segment. Although the beginning of the field synchronization segment cannot be determined exactly by the bank of counters 1210 alone, the comparator will pin down the location of the field synchronization segment to within 77.3 microseconds. Exact location of the start of the field synchronization segment can be determined based on the fine structure of the output from correlator 900.

Assume that the noise in the front end of the receiver 102 is white Gaussian noise with double-sided spectral density of No. In a noise only interval not containing the field synchronization segment, an output sample is the sum of squares of two independent Gaussian random variables each with variance No/2. The probability that this sample X exceeds a threshold T is $$P(T)=Pr\{X>T\}=\exp\{-T/No\} \quad (12)$$

The expected value of X is E{X}=No. If the threshold is set at three times this average, T=3No, then $$P(3No)=0.05 \quad (13)$$

is the probability that this noise sample exceeds the threshold and thus results in the counter being incremented.

Over a one second interval of time, there would be over 40 determinations for each of the 313 counters. If the signal-to-ratio at the receiver is above −22 dB then the counters should quickly show which of the 313 intervals contain the FSS. This is because the processing gain is about 29 dB, giving FSS correlation outputs of 6 to 7 dB stronger than the correlator outputs' noise background.

There are many ways in which the correlator output can be used to determine the location of the field synchronization segment. In one example, the bank of counters 1210 is replaced by a bank of accumulators. The peak correlation for each of the 313 intervals is accumulated to produce 313 partial sums. That is, accumulator 1 accumulates the peak correlations for the 1st, 314th, 627th, etc. intervals. Over many frames, the largest partial sum will be the one corresponding to the field synchronization segment.

Once the field synchronization segment is identified, time-gated delay lock loops can be used to maintain lock onto multipath components of the received broadcast signal's field synchronization segment. Non-coherent combining of these delay lock loop outputs can be done to improve the processing gain.

Once framing is established, individual data segments can be identified and tested for codewords. In the example of FIG. 11, it is assumed that certain data segments are preselected for the low data rate channel. Then, the numerical position of the data segments is determined 1220 and the preselected data segments are processed for codewords. For example, if data segments 10–50 are preselected for the low data rate channel, then the receiver 102 need only count to segment 10 relative to the field synchronization segment and then process segments 10–50 for codewords.

Referring again to FIG. 12, assume that time interval #137 was identified as the field synchronization segment. The counter 1250 counts to data segments 10–50 with respect to the field synchronization segment and these data segments would be processed by back end 800.

If the transmitter were to insert codewords into segments when the opportunity arises, then the receiver does not know whether a data segment contains a codeword. As a result, after the receiver establishes framing, each data segment is processed by a bank of correlators, for example as shown in FIG. 8. Comparator 810 selects the most probable codeword based on correlation strength, but there is an additional decision as to whether a codeword was sent at all. In one approach, this decision is based on all of the correlator outputs. One example is to decide a codeword did not exist if there is no dominant peak correlator output among all of the correlator outputs. This is based on the fact that if a codeword was transmitted during this interval then the correlator output for the transmitted codeword would, with high probability, have a much larger correlator output peak than in the other codeword correlator outputs. As an example, the largest correlator output peak might be required to be at least twice the corresponding correlator output peaks of the other correlator output peak values for a decision to be made that a codeword was transmitted in the particular segment interval.

In an alternate embodiment, the functionality shown in FIG. 12 is implemented in a DSP processor.

Although the invention has been described in considerable detail with reference to certain preferred embodiments thereof, other embodiments are possible. For example, some of the examples were illustrated using a specific frequency, such as IF or baseband. This is not meant to limit these examples to these specific frequencies. In general, different implementations can operate at different frequencies. Similarly, various steps may be implemented either as analog or digital processes. As another example, processing of the incoming DTV signal can occur either in real-time, with no storage of the incoming signal, or by retrieving samples of the DTV signal from memory. As a final example, different types of templates may be used to achieve the correlation desired.

In the ATSC standard, the field synchronization segments use binary amplitude symbols while in general up to eight levels of amplitude are allowed in the transmitter's 8-VSB modulation signal. Commonly, the codewords will be selected to use 2 levels, 4 levels, or 8 levels of amplitude in the codeword symbol sequence. When more level symbols are used for codewords, there are more choices of codewords with good autocorrelation and cross correlation properties, thus improving the detection of codewords at the receiver 102. More levels, however, make the correlators in receiver 102 more complex.

In alternate embodiments, DTV signals other than ATSC signals can be used. All DTV signals rely on data segments which are organized into frames. Codewords can replace any of these data segments, resulting in a robust, low data rate transmission, so long as the replacement does not degrade the rest of the DTV signal in an unacceptable way. For example, if the data segments in a DTV format are independently encoded so that replacing one data segment does not affect the decoding of the other data segments, then data segments can be individually replaced on an as-available basis. The data segments preferably are replaced at the transport layer, although this is not required.

Transmitting GPS Aiding Information Using DTV Signals

Initially devised in 1974, the global positioning system (GPS) is widely used for position location, navigation, survey, and time transfer. The GPS system employs a constellation of 24 on-orbit satellites in sub-synchronous 12 hour orbits. Each satellite carries a precision clock and transmits a pseudo-noise signal, which a GPS receiver can precisely track to determine a pseudo-range between the GPS receiver and the GPS satellite. By tracking four or more satellites, the receiver can determine precise position in three dimensions in real time, world-wide. Further details are provided in, for example, B. W. Parkinson and J. J. Spilker, Jr., Global Positioning System—Theory and Applications, Volumes I and II, AIAA, Washington, D.C., 1996.

GPS has revolutionized the technology of navigation and position location. However, in some situations, the effectiveness of GPS is reduced. Because the GPS signals are transmitted at relatively low power levels (less than 100 watts) and over great distances, the received signal strength is relatively weak (on the order of −160 dBw as received by an omni-directional antenna). Thus, the signal is marginally useful or not useful at all in the presence of blockage or inside a building; the accuracy of GPS position location in these instances can deteriorate significantly or even completely.

However, GPS position determination can be aided by the transmission of data that make GPS more robust to attenuation and multipath. Examples of this type of data include the current positions of the GPS satellites and clock correction information based on atomic standards. Additional examples include Doppler information, information about the Earth's atmosphere including Ionospheric effects that may alter or disrupt the satellite signals. Further examples include a list of satellites that should be visible given the location of the user, spatial coordinate data for those selected satellites, and predicted Doppler data for those selected satellites. Examples might also include the data that is modulated onto the C/A GPS code signals. This data might also include information that aids a device in tracking and determining the precise distance to GPS satellites. These types of data are referred to herein as GPS aiding information.

Devices can use this low-data-rate GPS aiding information to integrate GPS satellite signals more efficiently and/or for longer periods of time according to conventional, well-known techniques. These techniques are generally referred to as Assisted GPS, Aided GPS, or A-GPS. Devices using GPS aiding information are more robust to attenuation caused by obstructions; further, the GPS aiding information makes it possible for these devices to obtain severely attenuated GPS signals from far below the noise floor. As a result, GPS position determination can be improved by the use of this GPS aiding information, especially when the GPS pseudo-noise signals are attenuated.

Furthermore, GPS receivers normally determine their position by computing relative times of arrival of signals transmitted simultaneously from a multiplicity of GPS (or NAVSTAR) satellites. These satellites transmit, as part of their message, both satellite positioning data, so-called "ephemeris" data, as well as data on clock timing. This information is sent in a channel that broadcasts at 50 bps. In other words, it is possible for a device to receive GPS aiding information directly from the GPS satellite itself. However, the process of searching for and acquiring GPS signals, reading the ephemeris data for a multiplicity of satellites and computing the location of the device from this data is time consuming, often requiring several minutes. In many cases, this lengthy processing time is unacceptable and, furthermore, greatly limits battery life in portable applications. This processing time also makes it very difficult to perform real-time position fixes for applications that require constant position updates, such as real-time electronic street maps used in automobiles.

In a preferred embodiment, the GPS aiding information is transmitted to the end user device through digital television (DTV) broadcast signals. For example, the GPS aiding information typically requires only a low data rate. Thus, the techniques described above are well suited to disseminating the GPS aiding information via the DTV broadcast signals. One advantage of this approach is that this communications channel is fairly robust. Compared to many other types of communications channels, the DTV-based communications channel described above can be recovered at lower signal-to-noise ratios, for example in remote areas or in locations where interference or multipath causes problems. The GPS aiding information allows the GPS receiver to more effectively scan for available GPS signals. The aiding information also makes it easier for GPS receivers to find GPS signals below the noise floor. In other embodiments, the DTV signals comprising GPS aiding information are disseminated by other means, both wired and wireless.

Figure 13:
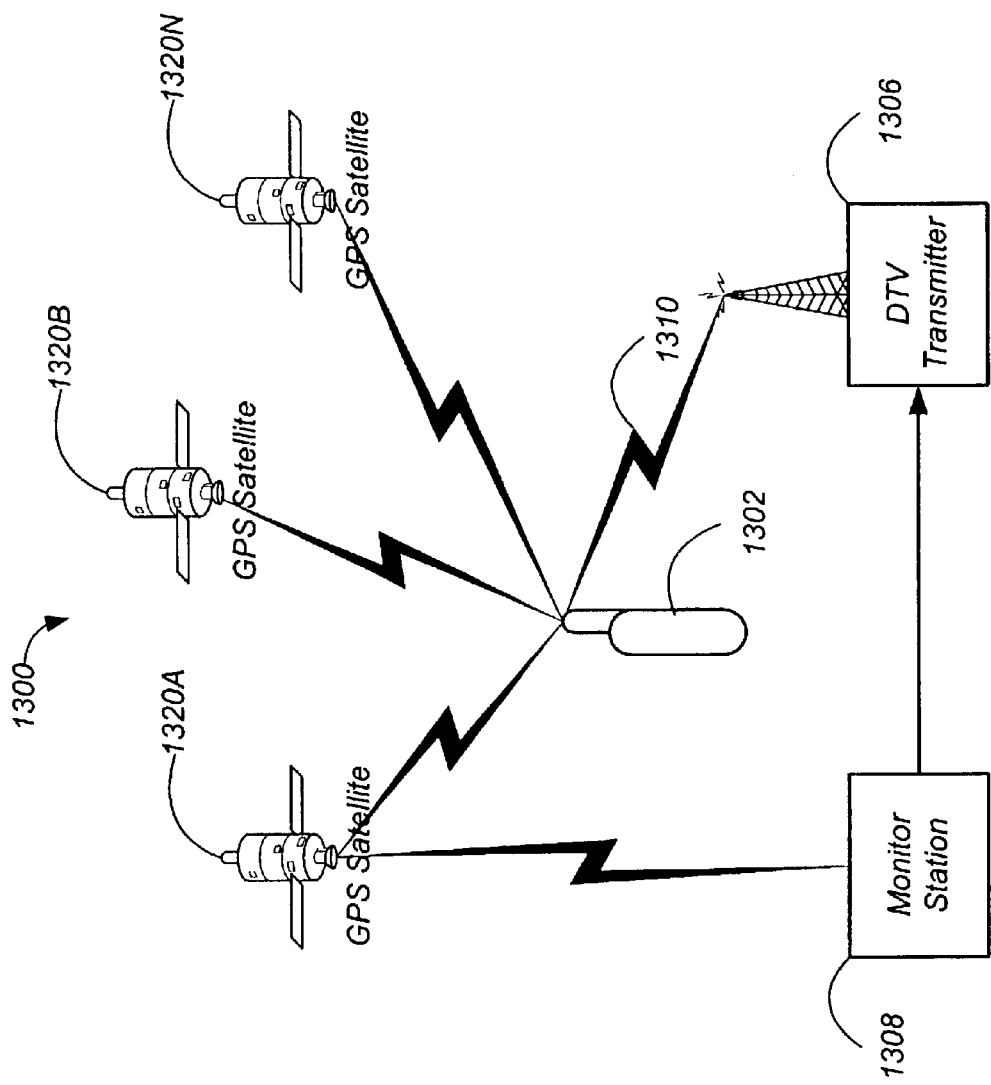
FIG. 13 shows a system including a GPS receiver and a plurality of GPS satellites according to one implementation.
Figure 14:
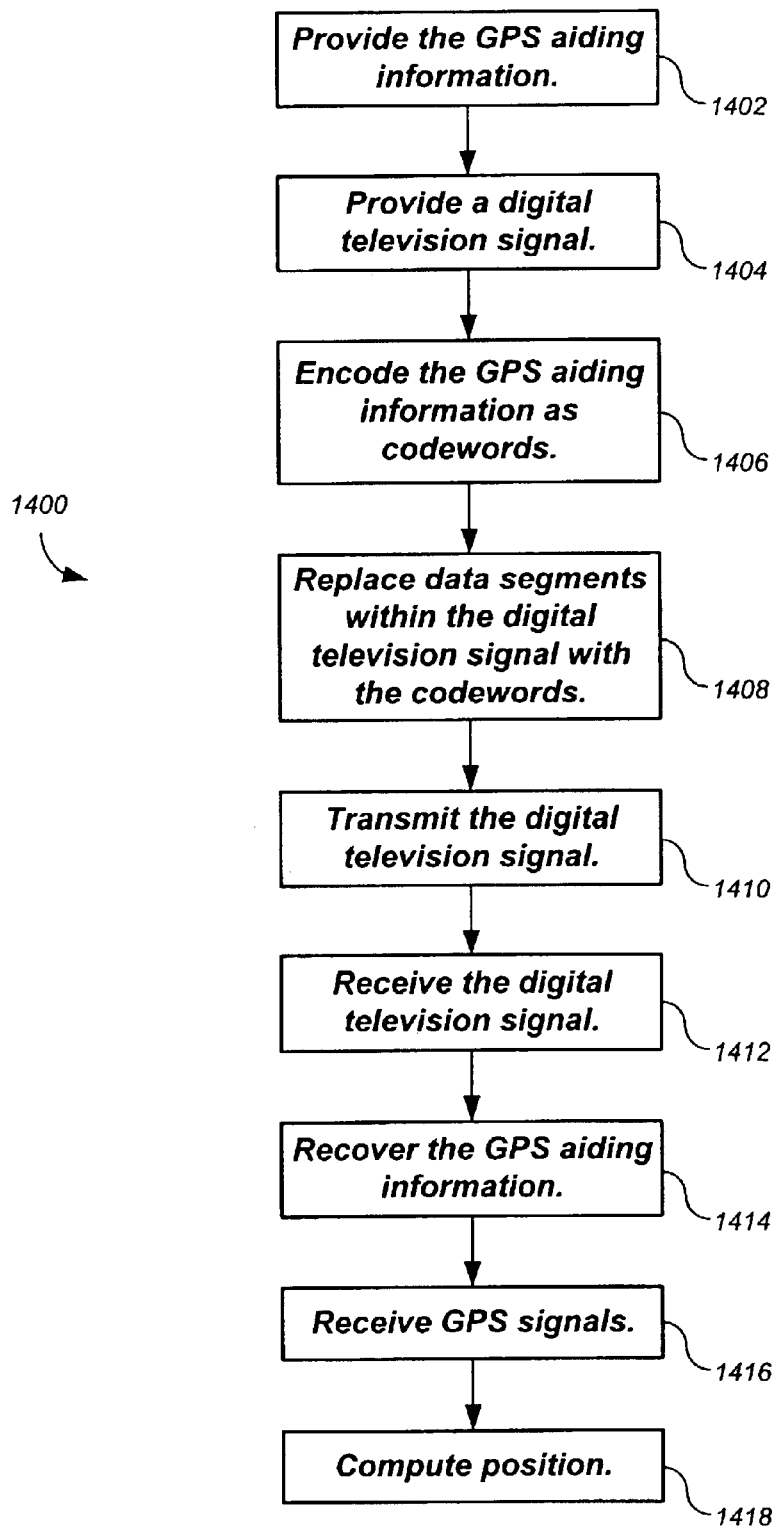
FIG. 14 shows a process performed by the system of FIG. 13 according to one embodiment.

FIG. 13 shows a system 1300 including a GPS receiver 1302 and a plurality of GPS satellites 1320A, 1320B, and 1320N according to one implementation. FIG. 14 shows a process 1400 performed by system 1300 according to one embodiment.

A DTV transmitter 1306 provides GPS aiding information (step 1402). In one embodiment, one or more monitor stations 1308 receive the GPS signals transmitted by GPS satellites 1320. Monitor stations 1308 use the received GPS signals to determine the Doppler for those satellites, in addition to ephemeris information, using conventional techniques. This GPS aiding information is transmitted to DTV transmitter 1306 for retransmission to GPS receiver 1302.

DTV transmitter 1306 provides a digital television signal comprising a plurality of frames (step 1404). Each frame comprises a plurality of data segments. DTV transmitter 1306 encodes the GPS aiding information as codewords (step 1406) and replaces the data segments within the digital television signal with the codewords (step 1408) according to the techniques described above. DTV transmitter 1306 then transmits the digital television signal 1310 comprising the GPS aiding information (step 1410).

GPS receiver 1302 receives digital television signal 1310 (step 1412) and recovers the GPS aiding information (step 1414) according to the techniques described above. GPS receiver 1302 receives the signals transmitted by GPS satellites 1320 (step 1416) and computes the position of GPS receiver 1302 (step 1418) using the GPS aiding information and the signals transmitted by GPS satellites 1320 according to conventional techniques.

In other embodiments, the approach described above is used with navigation systems other than GPS that use a constellation of Earth-orbiting satellites having known positions and generating pseudo-random noise type signals to receivers wherein Doppler compensated signal propagation times are measured to calculate user position and velocity.

Figure 15:
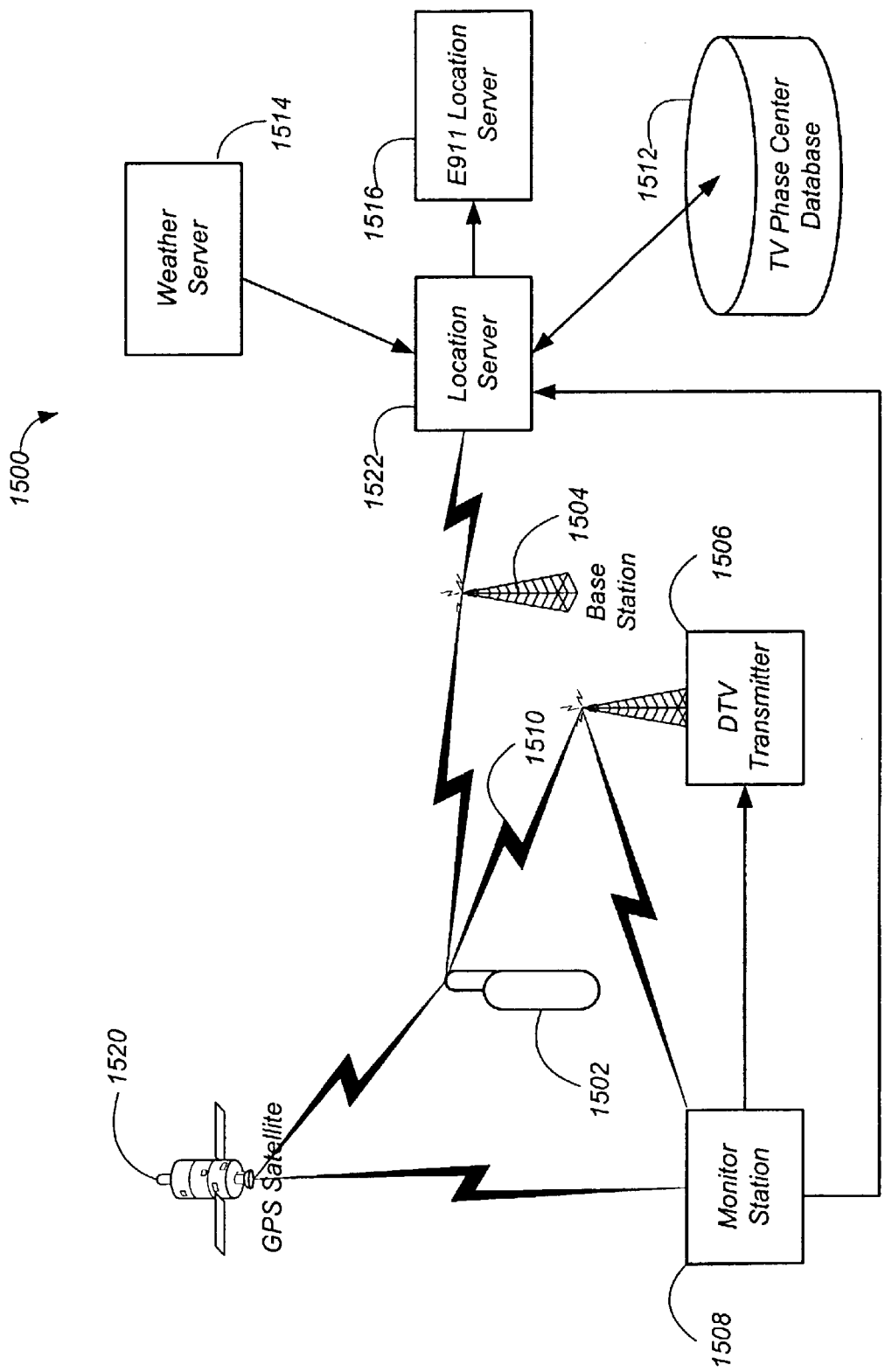
FIG. 15 shows a system including a GPS receiver and only a single GPS satellite according to one implementation.

FIG. 15 shows a system 1500 including a GPS receiver 1502 and only a single GPS satellite 1520 according to one implementation. Of course, a single GPS satellite 1520 alone is inadequate for position determination. In this embodiment, GPS receiver 1502 also employs pseudo-ranges to one or more DTV transmitters 1506 in position determination.

Figure 16:
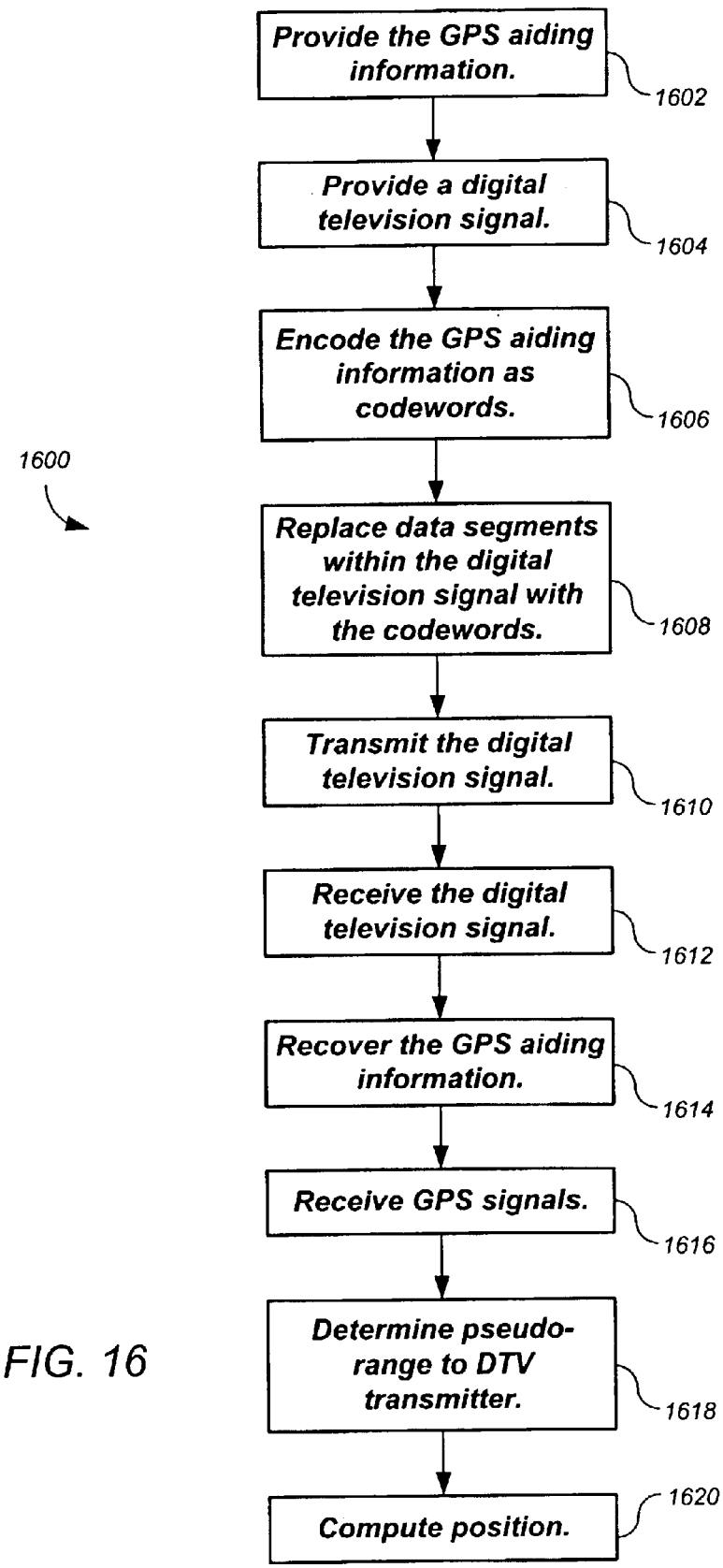
FIG. 16 shows a process performed by system according to one embodiment.

FIG. 16 shows a process 1600 performed by system 1500 according to one embodiment. A DTV transmitter 1506 provides GPS aiding information (step 1602). In one embodiment, one or more monitor stations 1508 receive the GPS signals transmitted by GPS satellite 1520. Monitor stations 1508 use the received GPS signals to determine the Doppler for the satellite, in addition to ephemeris information, using conventional techniques. This GPS aiding information is transmitted to DTV transmitter 1506 for retransmission to GPS receiver 1502.

DTV transmitter 1506 provides a digital television signal comprising a plurality of frames (step 1604). Each frame comprises a plurality of data segments. DTV transmitter 1506 encodes the GPS aiding information as codewords (step 1606) and replaces the data segments within the digital television signal with the codewords (step 1608) according to the techniques described above. DTV transmitter 1506 then transmits the digital television signal 1510 comprising the GPS aiding information (step 1610).

GPS receiver 1502 receives digital television signal 1510 (step 1612) and recovers the GPS aiding information (step 1614) according to the techniques described above. GPS receiver 1502 receives the signals transmitted by GPS satellite 1520 (step 1616). GPS receiver 1502 determines a pseudo-range between GPS receiver 1502 and DTV transmitter 1506 based on a known component of the digital television signal transmitted by DTV transmitter 1506 (step 1618). GPS receiver 1502 then computes the position of GPS receiver 1502 (step 1620) using the GPS aiding information, the signals transmitted by GPS satellites 1520, and the pseudo-range between GPS receiver 1502 and DTV transmitter 1506.

Techniques for determining the position of a user terminal using the American Television Standards Committee (ATSC) digital television (DTV) signal are disclosed in commonly-owned copending U.S. Non-provisional patent application Ser. No. 09/887,158, "Position Location using Broadcast Digital Television Signals," by James J. Spilker and Matthew Rabinowitz, filed Jun. 21, 2001, the disclosure thereof incorporated by reference herein in its entirety. Techniques for determining the position of a user terminal using the European Telecommunications Standards Institute (ETSI) Digital Video Broadcasting-Terrestrial (DVB-T) signal are disclosed in commonly-owned copending U.S. Provisional patent application Ser. No. 09/932,010, "Position Location using Terrestrial Digital Video Broadcast Television Signals," by James J. Spilker, Jr. and Matthew Rabinowitz, filed Aug. 17, 2001, the disclosure thereof incorporated by reference herein in its entirety. Techniques for determining the position of a user terminal using the Japanese Integrated Services Digital Broadcasting-Terrestrial (ISDB-T) signal are disclosed in commonly-owned copending U.S. Non-provisional Patent Application Ser. No. 60/337,834, "Wireless Position Location Using the Japanese ISDB-T Digital TV Signals," by James J. Spilker, filed Nov. 9, 2001, the disclosure thereof incorporated by reference herein in its entirety.

Each of these television signals includes known components that can be used to obtain a pseudo-range to the transmitter of the television signal. Suitable components within the ATSC digital television signal include synchronization codes such as the Field Synchronization Segment within an ATSC data frame and the Synchronization Segment within a Data Segment within an ATSC data frame. Suitable components within the ETSI DVB-T and ISDB-T digital television signals include scattered pilot carriers.

GPS receiver 1502 computes the position of GPS receiver 1502 (step 1620) using the DTV pseudo-range, the GPS aiding information and the signals transmitted by GPS satellite 1520. Techniques for position determination using DTV and GPS signals are disclosed in commonly-owned, copending U.S. Non-provisional patent application Ser. No. 10/159,478, "Position Location using Global Positioning Signals Augmented by Broadcast Television Signals," by Matthew Rabinowitz and James J. Spilker, Jr., filed May 31, 2002, the disclosure thereof incorporated by reference herein in its entirety. Computation of the position of GPS receiver 1502 can include computations using information describing the phase center (i.e., the location) of each DTV transmitter 1506 provided by a database 1512 and weather information provided by a weather server 1514, and can be performed either by GPS receiver 1502 or by a separate location server 1522. Data can be relayed between GPS receiver 1502 and location server 1504 using a wireless base station 1504 or by other methods.

Of course, employing only a single DTV signal and a single GPS signal is inadequate to determine a position in three dimensions. A further signal, such as a second GPS signal or a second DTV signal, can be used as a third signal. Further GPS and/or DTV signals can be employed as well.

In other embodiments, the approach described above is used with navigation systems other than GPS that use a constellation of Earth-orbiting satellites having known positions and generating pseudo-random noise type signals to receivers wherein Doppler compensated signal propagation times are measured to calculate user position and velocity.

Other signals within digital television signals can be used to transmit GPS aiding information. For example, the Advanced Television Systems Committee (ATSC) is currently considering a new standard based on the working draft entitled "Synchronization Standard For Distributed Transmission." This proposed standard is for adding transmitters to reach TV receivers that may be blocked from a primary transmitter. It describes techniques that allow construction of single frequency networks (SFNs) using a multiplicity of transmitters.

This proposed standard allows for transmitters in the SFNs to transmit identification signals sometimes called "buried identification signals" or "watermarks." These identification signals allow unique identification of transmitters so as to enable system monitoring and measurements.

An identification signal carries a Kasami code binary sequence that is transmitted repeatedly throughout the period when it is enabled in the transmissions from the particular transmitter with which it is associated. Each Kasami code is uniquely determined by the code sequence generator preloading values that are unique to each transmitter. The bits of the Kasami code are clocked at the symbol rate of the host 8-VSB signal. This identification bit sequence is sent to the equivalent of a 2-VSB modulator for transmission with the 8-VSB host signal. Typically this identification signal will be transmitted at a low enough power level to minimize interference with the normal digital TV reception of the 8-VSB host signal.

The start of a transmitter identification signal's Kasami code sequence will be emitted simultaneously with the first symbol of the of the first data segment following the Data Field Sync segment of the host 8-VSB signal. Within a Data Field the Kasami code sequence will occur three and a fraction time where the fourth sequence is truncated upon reaching the data segment sync at the start of the next Data Frame Sync segment. This identification signal is not transmitted during the Data Field Sync segment and restarts on the data segment immediately following the Data Field Sync segment.

This identification signal can be used to transmit a low data rate signal by phase inversion of the code sequence associated with the transmitter. This phase inversion shall occur on a data-field-by-data-field basis. Since a data field repeats every 24.2 ms, this data rate is 41.3 bits per seconds. This low data rate channel can be used to provide GPS aiding information.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus for providing satellite positioning system aiding information to a satellite positioning system receiver configured to determine the position of the satellite positioning system receiver using the satellite positioning system aiding information and the propagation time of a signal transmitted by a satellite in the satellite positioning system, the apparatus comprising:

a second satellite positioning system receiver to receive the satellite positioning system aiding information;

a channel coder to provide a digital television signal comprising a plurality of frames, each frame comprising a plurality of data segments;

an encoder to encode the satellite positioning system aiding information as codewords;

a packet multiplexer to replace data segments within the digital television signal with the codewords; and a transmitter to transmit the digital television signal;

wherein the satellite positioning system receiver receives the digital television signal and recovers the satellite positioning system aiding information.

2. The apparatus of claim 1, wherein the satellite positioning system is the global positioning system (GPS).

3. The apparatus of claim 2, wherein the satellite positioning system receiver determines the position of the satellite positioning system receiver based on the signal received from the satellite positioning system satellite and the satellite positioning system aiding information.

4. The apparatus of claim 2, wherein the satellite positioning system aiding information comprises at least one of the group comprising:

a position of the satellite positioning system satellite;

clock correction information for the satellite positioning system satellite;

Doppler information for the signals transmitted by the satellite positioning system satellite;

information regarding atmospheric effects on the signal transmitted by the satellite positioning system satellite; and identification of the satellite positioning system satellites that are visible to the satellite positioning system receiver.

5. The apparatus of claim 2, wherein the digital television signal comprises at least one of the group comprising:

an American Television Standards Committee (ATSC) digital television signal;

a European Telecommunications Standards Institute (ETSI) Digital Video Broadcasting-Terrestrial (DVB-T) signal; and a Japanese Integrated Services Digital Broadcasting-Terrestrial (ISDB-T) signal.

6. An apparatus for recovering satellite positioning system aiding information from a digital television signal, comprising:

a front end to receive the digital television signal, the digital television signal comprising a plurality of frames, each frame comprising a plurality of data segments, wherein at least one data segment has been replaced by at least one codeword representing the satellite positioning system aiding information; and a back end to select the data segments which have been replaced by codewords and to recover the satellite positioning system aiding information from the selected data segments.

7. The apparatus of claim 6, wherein the satellite positioning system is the global positioning system (GPS).

8. The apparatus of claim 7, wherein the satellite positioning system aiding information comprises at least one of the group comprising:

a position of the satellite positioning system satellite;

clock correction information for the satellite positioning system satellite;

Doppler information for the signals transmitted by the satellite positioning system satellite;

information regarding atmospheric effects on the signal transmitted by the satellite positioning system satellite; and identification of the satellite positioning system satellites that are visible to the satellite positioning system receiver.

9. The apparatus of claim 7, wherein the digital television signal comprises at least one of the group comprising:

an American Television Standards Committee (ATSC) digital television signal;

a European Telecommunications Standards Institute (ETSI) Digital Video Broadcasting-Terrestrial (DVB-T) signal; and a Japanese Integrated Services Digital Broadcasting-Terrestrial (ISDB-T) signal.

10. An apparatus for determining a position of a satellite positioning system receiver using a satellite positioning system, comprising:

a front end to receive a signal transmitted by a satellite in the satellite positioning system, and to receive a digital television signal comprising a plurality of frames, each frame comprising a plurality of data segments, wherein at least one data segment has been replaced by at least one codeword representing satellite positioning system aiding information;

a back end to select the data segments which have been replaced by codewords and to recover the satellite positioning system aiding information from the selected data segments; and a processor to determine a position of the satellite positioning system receiver based on the signal received from the satellite positioning system satellite and the satellite positioning system aiding information.

11. The apparatus of claim 10, wherein the satellite positioning system is the global positioning system (GPS).

12. The apparatus of claim 11, wherein the satellite positioning system aiding information comprises at least one of the group comprising:

a position of the satellite positioning system satellite;

clock correction information for the satellite positioning system satellite;

Doppler information for the signals transmitted by the satellite positioning system satellite;

information regarding atmospheric effects on the signal transmitted by the satellite positioning system satellite; and identification of the satellite positioning system satellites that are visible to the satellite positioning system receiver.

13. The apparatus of claim 11, wherein the digital television signal comprises at least one of the group comprising:

an American Television Standards Committee (ATSC) digital television signal;

a European Telecommunications Standards Institute (ETSI) Digital Video Broadcasting-Terrestrial (DVB-T) signal; and a Japanese Integrated Services Digital Broadcasting-Terrestrial (ISDB-T) signal.

14. The apparatus of claim 11, wherein the processor determines a pseudo-range between the satellite positioning system receiver and a transmitter of the digital television signal based on a known component of the digital television signal; and determines a position of the satellite positioning system receiver based on the pseudo-range, the signal received from the satellite positioning system satellite and the satellite positioning system aiding information.

15. An apparatus for providing satellite positioning system aiding information to a satellite positioning system receiver configured to determine the position of the satellite positioning system receiver using the satellite positioning system aiding information and the propagation time of a signal transmitted by a satellite in the satellite positioning system, the apparatus comprising:

second satellite positioning system receiver means for receiving the satellite positioning system aiding information;

channel coder means for providing a digital television signal comprising a plurality of frames, each frame comprising a plurality of data segments;

encoder to means for encoding the satellite positioning system aiding information as codewords;

packet multiplexer means for replacing data segments within the digital television signal with the codewords; and transmitter means for transmitting the digital television signal;

wherein the satellite positioning system receiver receives the digital television signal and recovers the satellite positioning system aiding information.

16. The apparatus of claim 15, wherein the satellite positioning system is the global positioning system (GPS).

17. The apparatus of claim 16, wherein the satellite positioning system receiver determines the position of the satellite positioning system receiver based on the signal received from the satellite positioning system satellite and the satellite positioning system aiding information.

18. The apparatus of claim 16, wherein the satellite positioning system aiding information comprises at least one of the group comprising:

a position of the satellite positioning system satellite;

clock correction information for the satellite positioning system satellite;

Doppler information for the signals transmitted by the satellite positioning system satellite;

information regarding atmospheric effects on the signal transmitted by the satellite positioning system satellite; and identification of the satellite positioning system satellites that are visible to the satellite positioning system receiver.

19. The apparatus of claim 16, wherein the digital television signal comprises at least one of the group comprising:

an American Television Standards Committee (ATSC) digital television signal;

a European Telecommunications Standards Institute (ETSI) Digital Video Broadcasting-Terrestrial (DVB-T) signal; and a Japanese Integrated Services Digital Broadcasting-Terrestrial (ISDB-T) signal.

20. An apparatus for recovering satellite positioning system aiding information from a digital television signal, comprising:

front end means for receiving the digital television signal, the digital television signal comprising a plurality of frames, each frame comprising a plurality of data segments, wherein at least one data segment has been replaced by at least one codeword representing the satellite positioning system aiding information; and back end means for selecting the data segments which have been replaced by codewords and to recover the satellite positioning system aiding information from the selected data segments.

21. The apparatus of claim 20, wherein the satellite positioning system is the global positioning system (GPS).

22. The apparatus of claim 21, wherein the satellite positioning system aiding information comprises at least one of the group comprising:

a position of the satellite positioning system satellite;

clock correction information for the satellite positioning system satellite;

Doppler information for the signals transmitted by the satellite positioning system satellite;

information regarding atmospheric effects on the signal transmitted by the satellite positioning system satellite; and identification of the satellite positioning system satellites that are visible to the satellite positioning system receiver.

23. The apparatus of claim 21, wherein the digital television signal comprises at least one of the group comprising:
   an American Television Standards Committee (ATSC) digital television signal;
   a European Telecommunications Standards Institute (ETSI) Digital Video Broadcasting-Terrestrial (DVB-T) signal; and
   a Japanese Integrated Services Digital Broadcasting-Terrestrial (ISDB-T) signal.

24. An apparatus for determining a position of a satellite positioning system receiver using a satellite positioning system, comprising:
   front end means for receiving a signal transmitted by a satellite in the satellite positioning system, and to receive a digital television signal comprising a plurality of frames, each frame comprising a plurality of data segments, wherein at least one data segment has been replaced by at least one codeword representing satellite positioning system aiding information;
   back means for selecting the data segments which have been replaced by codewords and to recover the satellite positioning system aiding information from the selected data segments; and
   processor means for determining a position of the satellite positioning system receiver based on the signal received from the satellite positioning system satellite and the satellite positioning system aiding information.

25. The apparatus of claim 24, wherein the satellite positioning system is the global positioning system (GPS).

26. The apparatus of claim 25, wherein the satellite positioning system aiding information comprises at least one of the group comprising:
   a position of the satellite positioning system satellite;
   clock correction information for the satellite positioning system satellite;
   Doppler information for the signals transmitted by the satellite positioning system satellite;
   information regarding atmospheric effects on the signal transmitted by the satellite positioning system satellite; and
   identification of the satellite positioning system satellites that are visible to the satellite positioning system receiver.

27. The apparatus of claim 25, wherein the digital television signal comprises at least one of the group comprising:
   an American Television Standards Committee (ATSC) digital television signal;
   a European Telecommunications Standards Institute (ETSI) Digital Video Broadcasting-Terrestrial (DVB-T) signal; and
   a Japanese Integrated Services Digital Broadcasting-Terrestrial (ISDB-T) signal.

28. The apparatus of claim 25, wherein the processor means
   determines a pseudo-range between the satellite positioning system receiver and a transmitter of the digital television signal based on a known component of the digital television signal; and
   determines a position of the satellite positioning system receiver based on the pseudo-range, the signal received from the satellite positioning system satellite and the satellite positioning system aiding information.

29. A method for providing satellite positioning system aiding information to a satellite positioning system receiver configured to determine the position of the satellite positioning system receiver using the satellite positioning system aiding information and the propagation time of a signal transmitted by a satellite in the satellite positioning system, the method comprising:
   providing the satellite positioning system aiding information;
   providing a digital television signal comprising a plurality of frames, each frame comprising a plurality of data segments;
   encoding the satellite positioning system aiding information as codewords;
   replacing data segments within the digital television signal with the codewords; and
   transmitting the digital television signal;
   wherein the satellite positioning system receiver receives the digital television signal and recovers the satellite positioning system aiding information.

30. The method of claim 29, wherein the satellite positioning system is the global positioning system (GPS).

31. The method of claim 30, wherein the satellite positioning system receiver determines the position of the satellite positioning system receiver based on the signal received from the satellite positioning system satellite and the satellite positioning system aiding information.

32. The method of claim 30, wherein the satellite positioning system aiding information comprises at least one of the group comprising:
   a position of the satellite positioning system satellite;
   clock correction information for the satellite positioning system satellite;
   Doppler information for the signals transmitted by the satellite positioning system satellite;
   information regarding atmospheric effects on the signal transmitted by the satellite positioning system satellite; and
   identification of the satellite positioning system satellites that are visible to the satellite positioning system receiver.

33. The method of claim 30, wherein the digital television signal comprises at least one of the group comprising:
   an American Television Standards Committee (ATSC) digital television signal;
   a European Telecommunications Standards Institute (ETSI) Digital Video Broadcasting-Terrestrial (DVB-T) signal; and
   a Japanese Integrated Services Digital Broadcasting-Terrestrial (ISDB-T) signal.

34. A method for recovering satellite positioning system aiding information from a digital television signal, comprising:
   receiving the digital television signal, the digital television signal comprising a plurality of frames, each frame comprising a plurality of data segments, wherein at least one data segment has been replaced by at least one codeword representing the satellite positioning system aiding information;
   selecting the data segments which have been replaced by codewords; and
   recovering the satellite positioning system aiding information from the selected data segments.

35. The method of claim 34, wherein the satellite positioning system is the global positioning system (GPS).

36. The method of claim 35, wherein the satellite positioning system aiding information comprises at least one of the group comprising:
- a position of the satellite positioning system satellite;
- clock correction information for the satellite positioning system satellite;
- Doppler information for the signals transmitted by the satellite positioning system satellite;
- information regarding atmospheric effects on the signal transmitted by the satellite positioning system satellite; and
- identification of the satellite positioning system satellites that are visible to the satellite positioning system receiver.

37. The method of claim 35, wherein the digital television signal comprises at least one of the group comprising:
- an American Television Standards Committee (ATSC) digital television signal;
- a European Telecommunications Standards Institute (ETSI) Digital Video Broadcasting-Terrestrial (DVB-T) signal; and
- a Japanese Integrated Services Digital Broadcasting-Terrestrial (ISDB-T) signal.

38. A method for determining a position of a satellite positioning system receiver using a satellite positioning system, comprising:
- receiving at the satellite positioning system receiver a signal transmitted by a satellite in the satellite positioning system;
- receiving at the satellite positioning system receiver a digital television signal comprising a plurality of frames, each frame comprising a plurality of data segments, wherein at least one data segment has been replaced by at least one codeword representing satellite positioning system aiding information;
- selecting the data segments which have been replaced by codewords;
- recovering the satellite positioning system aiding information from the selected data segments; and
- determining a position of the satellite positioning system receiver based on the signal received from the satellite positioning system satellite and the satellite positioning system aiding information.

39. The method of claim 38, wherein the satellite positioning system is the global positioning system (GPS).

40. The method of claim 39, wherein the satellite positioning system aiding information comprises at least one of the group comprising:
- a position of the satellite positioning system satellite;
- clock correction information for the satellite positioning system satellite;
- Doppler information for the signals transmitted by the satellite positioning system satellite;
- information regarding atmospheric effects on the signal transmitted by the satellite positioning system satellite; and
- identification of the satellite positioning system satellites that are visible to the satellite positioning system receiver.

41. The method of claim 39, wherein the digital television signal comprises at least one of the group comprising:
- an American Television Standards Committee (ATSC) digital television signal;
- a European Telecommunications Standards Institute (ETSI) Digital Video Broadcasting-Terrestrial (DVB-T) signal; and
- a Japanese Integrated Services Digital Broadcasting-Terrestrial (ISDB-T) signal.

42. The method of claim 39, further comprising:
- determining a pseudo-range between the satellite positioning system receiver and a transmitter of the digital television signal based on a known component of the digital television signal; and
- determining a position of the satellite positioning system receiver based on the pseudo-range, the signal received from the satellite positioning system satellite and the satellite positioning system aiding information.

43. Computer-readable media embodying instructions executable by a computer to perform a method for providing satellite positioning system aiding information to a satellite positioning system receiver configured to determine the position of the satellite positioning system receiver using the satellite positioning system aiding information and the propagation time of a signal transmitted by a satellite in the satellite positioning system, the method comprising:
- providing the satellite positioning system aiding information;
- providing a digital television signal comprising a plurality of frames, each frame comprising a plurality of data segments;
- encoding the satellite positioning system aiding information as codewords;
- replacing data segments within the digital television signal with the codewords; and
- transmitting the digital television signal;
- wherein the satellite positioning system receiver receives the digital television signal and recovers the satellite positioning system aiding information.

44. The media of claim 43, wherein the satellite positioning system is the global positioning system (GPS).

45. The media of claim 44, wherein the satellite positioning system receiver determines the position of the satellite positioning system receiver based on the signal received from the satellite positioning system satellite and the satellite positioning system aiding information.

46. The media of claim 44, wherein the satellite positioning system aiding information comprises at least one of the group comprising:
- a position of the satellite positioning system satellite;
- clock correction information for the satellite positioning system satellite;
- Doppler information for the signals transmitted by the satellite positioning system satellite;
- information regarding atmospheric effects on the signal transmitted by the satellite positioning system satellite; and
- identification of the satellite positioning system satellites that are visible to the satellite positioning system receiver.

47. The media of claim 44, wherein the digital television signal comprises at least one of the group comprising:
- an American Television Standards Committee (ATSC) digital television signal;
- a European Telecommunications Standards Institute (ETSI) Digital Video Broadcasting-Terrestrial (DVB-T) signal; and
- a Japanese Integrated Services Digital Broadcasting-Terrestrial (ISDB-T) signal.

48. Computer-readable media embodying instructions executable by a computer to perform a method for recovering satellite positioning system aiding information from a digital television signal, the method comprising:

receiving the digital television signal, the digital television signal comprising a plurality of frames, each frame comprising a plurality of data segments, wherein at least one data segment has been replaced by at least one codeword representing the satellite positioning system aiding information;

selecting the data segments which have been replaced by codewords; and recovering the satellite positioning system aiding information from the selected data segments.

49. The media of claim 48, wherein the satellite positioning system is the global positioning system (GPS).

50. The media of claim 49, wherein the satellite positioning system aiding information comprises at least one of the group comprising:

a position of the satellite positioning system satellite;

clock correction information for the satellite positioning system satellite;

Doppler information for the signals transmitted by the satellite positioning system satellite;

information regarding atmospheric effects on the signal transmitted by the satellite positioning system satellite; and identification of the satellite positioning system satellites that are visible to the satellite positioning system receiver.

51. The media of claim 49, wherein the digital television signal comprises at least one of the group comprising:

an American Television Standards Committee (ATSC) digital television signal;

a European Telecommunications Standards Institute (ETSI) Digital Video Broadcasting-Terrestrial (DVB-T) signal; and a Japanese Integrated Services Digital Broadcasting-Terrestrial (ISDB-T) signal.

52. Computer-readable media embodying instructions executable by a computer to perform a method for determining a position of a satellite positioning system receiver using a satellite positioning system, the method comprising:

receiving at the satellite positioning system receiver a signal transmitted by a satellite in the satellite positioning system;

receiving at the satellite positioning system receiver a digital television signal comprising a plurality of frames, each frame comprising a plurality of data segments, wherein at least one data segment has been replaced by at least one codeword representing satellite positioning system aiding information;

selecting the data segments which have been replaced by codewords;

recovering the satellite positioning system aiding information from the selected data segments; and determining a position of the satellite positioning system receiver based on the signal received from the satellite positioning system satellite and the satellite positioning system aiding information.

53. The media of claim 52, wherein the satellite positioning system is the global positioning system (GPS).

54. The media of claim 53, wherein the satellite positioning system aiding information comprises at least one of the group comprising:

a position of the satellite positioning system satellite;

clock correction information for the satellite positioning system satellite;

Doppler information for the signals transmitted by the satellite positioning system satellite;

information regarding atmospheric effects on the signal transmitted by the satellite positioning system satellite; and identification of the satellite positioning system satellites that are visible to the satellite positioning system receiver.

55. The media of claim 53, wherein the digital television signal comprises at least one of the group comprising:

an American Television Standards Committee (ATSC) digital television signal;

a European Telecommunications Standards Institute (ETSI) Digital Video Broadcasting-Terrestrial (DVB-T) signal; and a Japanese Integrated Services Digital Broadcasting-Terrestrial (ISDB-T) signal.

56. The media of claim 53, wherein the method further comprises:

determining a pseudo-range between the satellite positioning system receiver and a transmitter of the digital television signal based on a known component of the digital television signal; and determining a position of the satellite positioning system receiver based on the pseudo-range, the signal received from the satellite positioning system satellite and the satellite positioning system aiding information.

* * * * *

UNITED STATES PATENT AND TRADEMARK OFFICE
CERTIFICATE OF CORRECTION

PATENT NO. : 6,727,847 B2 Page 1 of 1
APPLICATION NO. : 10/292316
DATED : April 27, 2004
INVENTOR(S) : Rabinowitz et al.

It is certified that error appears in the above-identified patent and that said Letters Patent is hereby corrected as shown below:

On the Title Page, Item (30) Related U.S. Application Data, please replace:

Continuation-in-part of application No. 10/003,128, filed on Nov. 14, 2001, application No. 10/292,316, and a continuation-in-part of application No. 10/159,478, filed on May 31, 2002, which is a continuation-in-part of application No. 09/887,158, filed on Jun. 21, 2001, now abandoned.

with:

Continuation-in-part of application No. 10/003,128, filed on Nov. 14, 2001, and a continuation-in-part of application No. 10/159,478, filed on May 31, 2002, which is a continuation-in-part of application No. 09/887,158, filed on Jun. 21, 2001, now abandoned.

Signed and Sealed this

Fourteenth Day of September, 2010

David J. Kappos
*Director of the United States Patent and Trademark Office*